United States Patent
Kamiwaki

[11] Patent Number: 6,113,335
[45] Date of Patent: Sep. 5, 2000

[54] UNLOADER

[75] Inventor: Tadayoshi Kamiwaki, Niihama, Japan

[73] Assignee: Sumitomo Heavy Industries, Ltd., Tokyo, Japan

[21] Appl. No.: 09/240,584

[22] Filed: Feb. 1, 1999

[30] Foreign Application Priority Data

| Feb. 25, 1998 | [JP] | Japan | ................................ | H10-060633 |
| Feb. 26, 1998 | [JP] | Japan | ................................ | H10-060403 |
| Mar. 4, 1998 | [JP] | Japan | ................................ | H10-067638 |

[51] Int. Cl.$^7$ .................................................. B65G 65/16
[52] U.S. Cl. ..................................... 414/139.6; 414/140.7
[58] Field of Search ............................. 414/137.1, 139.6, 414/140.7, 140.8, 140.9; 198/518, 519, 671

[56] References Cited

U.S. PATENT DOCUMENTS

| 5,238,346 | 8/1993 | Grathoff | ................................ | 414/140.7 |
| 5,320,471 | 6/1994 | Grathoff | ................................ | 414/140.7 |
| 5,370,490 | 12/1994 | Tsernatsch | ........................ | 414/139.6 |
| 5,626,218 | 5/1997 | Kamikawi | .......................... | 414/140.7 |

*Primary Examiner*—Gregory A. Morse
*Attorney, Agent, or Firm*—Arent Fox Kintner Plotkin & Kahn, PLLC

[57] ABSTRACT

An unloader wherein a screw feeder is mounted on a vertically conveying section so as to be ascendable and descendable freely and bulk cargo is fed into a receiving space of the vertically conveying section through a discharge port made in the screw casing, characterized by (i) the discharge port which is positioned by discharge blades of the screw feeder and extended downward by the length of ascending/descending stroke of the screw feeder and (ii) a blocking casing which is mounted on the vertically conveying section so that the outer surface of the screw casing comes in sliding contact with the blocking casing and the blocking casing closes generally the lower half of the discharge port while the screw feeder is in its mounted position. An unloader wherein (i) two endless belts are installed through the upward-, laterally, and downward-conveying sections, their carrying surfaces facing and overlapping each other, the two endless belt constituting a double-belt conveyor, (ii) the discharging end of the double-belt conveyor is positioned close to the bulk-cargo receiving portion of a discharge conveyor, and (iii) two end pulleys of the discharging end of the double-belt conveyor are differentiated from each other in height and drive the two endless belts. A double-belt unloader wherein (i) two end pulleys of the double-belt conveyor at the bottom of the longitudinally conveying section are differentiated from each other in height, (ii) the lower end pulley is supported in the longitudinally conveying section so as to be movable laterally as a whole, and (iii) a drive unit to drive the lower end pulley laterally is provided at the bottom of the longitudinally conveying section.

8 Claims, 21 Drawing Sheets

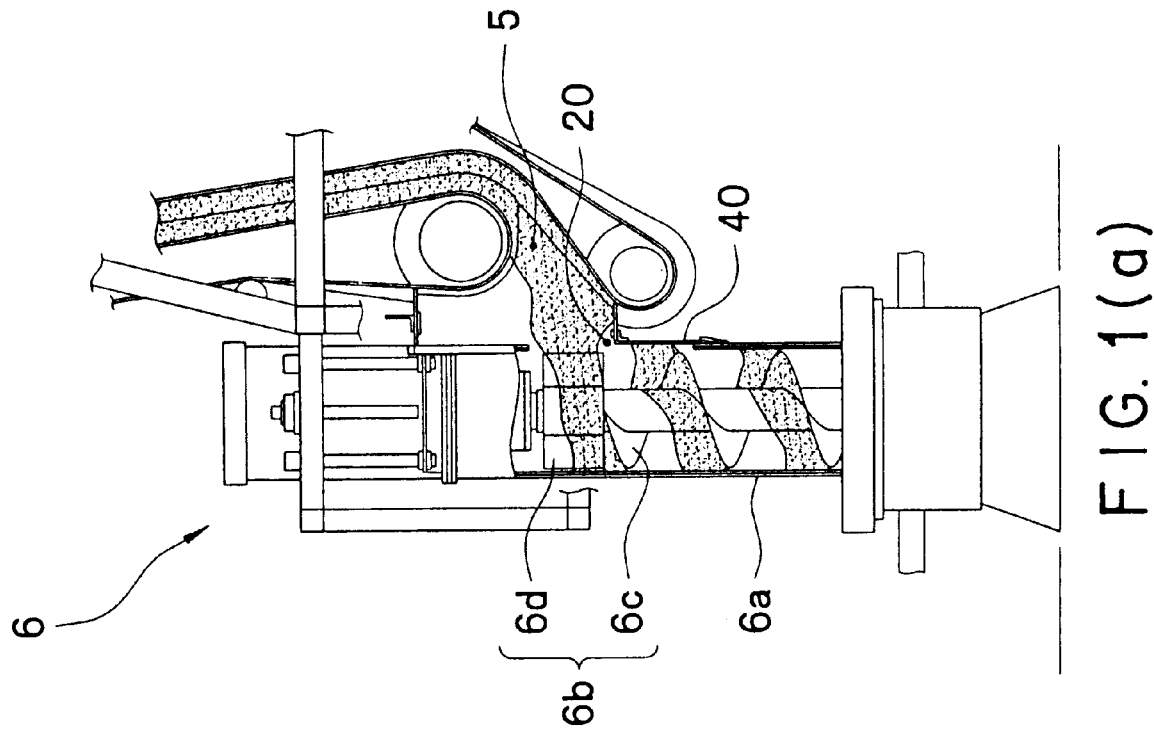
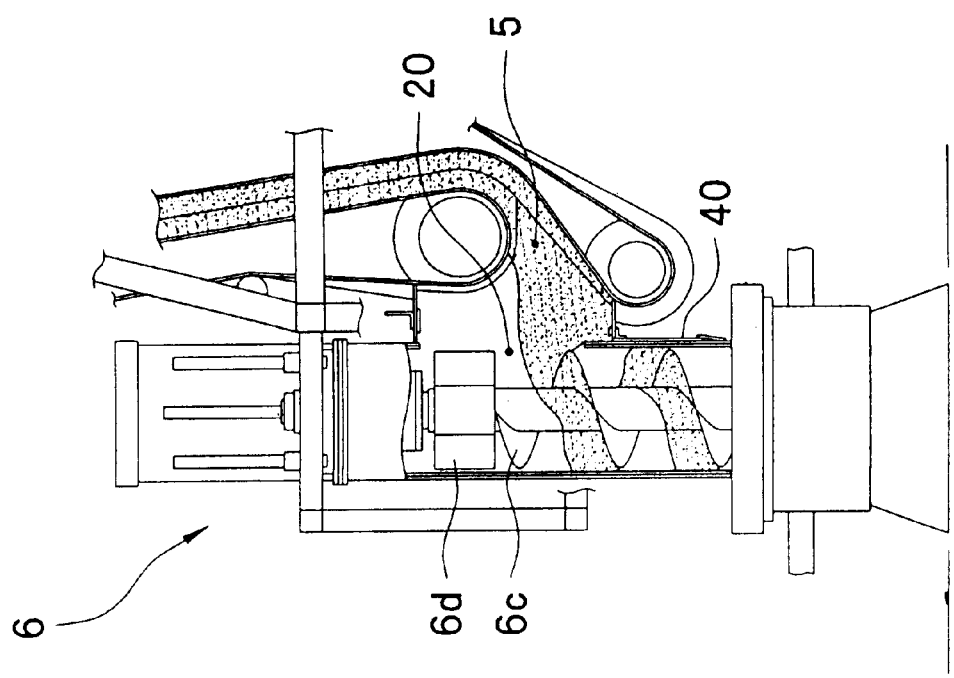
FIG. 1(a)
FIG. 1(b)

UNLOADER

BACKGROUND OF THE INVENTION

The present invention relates generally to an unloader, and more particularly to improvements in unloaders to unload bulk cargoes such as coal and grain from the holds of ships.

The conventional unloader comprises a travel frame, a slewing table mounted on the travel frame so as to be turnable freely, a boom mounted on the slewing table so as to be swingable up and down freely, a vertically conveying section mounted freely swingably on the front end of the boom, and a screw feeder for scraping and taking in bulk cargo mounted at the bottom of the vertically conveying section. The screw feeder has a cylindrical screw casing and a screw in the screw casing. The screw feeder, rotating the screw, scoops up bulk cargo through the bottom end of the screw casing, carries it upward, and feeds it into a receiving space between the two belts of the vertically conveying section.

The screw comprises a screw shaft, a spiral blade, and paddle-like discharge blades. Directly by the discharge blades, a discharge port for feeding bulk cargo to the receiving space is made in the screw casing.

At the back of the receiving space, a pair of tail pulleys are arranged up and down. The pair of belts are installed on the upper and lower tail pulleys, respectively, and through the vertically conveying section to catch therebetween and carry bulk cargo through the vertically conveying section. The space between and in front of the upper and lower tail pulleys is the receiving space.

Even while a ship is at its moorings, it rocks on the waves, especially on a rough sea in winter, which may cause the bottom of the ship to push up the bottom of the screw feeder. Accordingly, the screw feeder is so mounted on the bottom of the vertically conveying section that it can, when pushed up, move upward relative to the stationary vertically conveying section in order to prevent damage to the unloader.

When the screw feeder is pushed up largely and the discharge blades and the discharge port are raised above the receiving space of the vertically conveying section, the bulk cargo thrown out by the discharge blades does not enter the receiving space, but dashes against the upper tail pulley and scatters outside.

In accordance with the above, an object of the present invention is to provide an unloader wherein bulk cargo can, without fail, be fed from its screw feeder to its vertically conveying section even when the screw feeder is pushed up largely by the rocks of ships.

On the other hand, in case of the conventional unloader, bulk cargo in a ship's hold is carried by a vertical, upward-conveying section inserted in the bulk cargo through a horizontal boom to a downward-conveying section which is connected to the base of the horizontal boom. Then, bulk cargo slides down on a chute through the downward-conveying section onto a discharge conveyor on the ground side. To cope with such large-sized ships as are built in these years, the position of the base of the horizontal boom of such an unloader has to be raised high, which makes large the height difference between the horizontal boom and the discharge conveyor and, hence, the fall of bulk cargo. Therefore, bulk cargo dashes harder upon the discharge conveyor, becoming liable to break, generating larger noises and more dust, and posing a larger risk of damage to the discharge conveyor.

Disclosed in the Japanese Utility Model Publication No. 86940/H5 (1993) is a structure of continuous unloader to reduce shocks, noises, and dust when bulk cargo falls from such a boom conveyor onto such a discharge conveyor. According to the utility model, the second endless belt is so arranged through the downward-conveying section that its carrying surface faces and overlaps the carrying surface of the first endless belt in the downward-conveying section, the first endless belt hanging from the base of the boom. Bulk cargo is caught between the first and second endless belts constituting a double-belt conveyor and carried downward. The bottom (discharging end) of the double-belt conveyor is positioned close to a discharge conveyor on the ground side to make the fall of bulk cargo short.

On the other hand, a continuous loader/unloader of powder and grains is disclosed in the Japanese Unexamined Patent Application No. 267379/H7 (1995). A double-belt conveyor is arranged from the bottom of an upward-conveying section to be hung in the holds of ships, through a horizontal projecting arm, to the bottom of a column-like section on the land side to constitute a twin-belt conveying path of the shape of an upside-down U. Then, the bottom of the conveying path on the land side is brought down to near the upper surface of the quay and extended laterally along the upper surface of the quay, the lower endless belt given a lateral extension longer than that of the upper endless belt. This extra length of the lower endless belt is where powder and grains are discharged and taken in. The projecting arm can turn freely on the column-like section, but the laterally extending portion of the double-belt conveyor along the surface of the quay is stationary. Accordingly, when the projecting arm turns, the downward-conveying portion of the double-belt conveyor is twisted about the vertical axis of the column-like section.

In case of the above continuous unloader of the Japanese Utility Model Publication No. 86940/H5 (1993), bulk cargo is caught between the two endless belts and carried through the downward-conveying section of which the bottom is positioned near the discharge conveyor. Accordingly, the generation of dust at the bulk-cargo receiving portion of the discharge conveyor is reduced. However, because bulk cargo is not covered on the boom conveyor and at the connecting portion between the upward-conveying section and the boom conveyor, dust are generated in such places. Besides, although it is advantageous to make an end pulley the driving pulley in an ordinary belt conveyor, the end pulleys at the bottom of the downward-conveying section of the unloader can not be the driving pulleys, because each of the end pulleys is in the shape of a tsuzumi, or Japanese hand drum, and divided into several pieces side by side on the shaft and each piece is freely journaled. The end pulleys are suitable for closing in bulk cargo between the two belts, but can not be the driving pulleys. Accordingly, a direction-changing pulley adjacent to the belt-tension adjusting mechanism on the return side of each belt and in contact with the carrying surface of the belt is made the driving pulley. Such a driving pulley is liable to slip on the belt due to powdered bulk cargo sticking on the belt surface.

In case of the above continuous loader/unloader of powder and grains of the Japanese Unexamined Patent Application No. 267379/H7 (1995), the bottom portion of the downward-conveying mechanism of the column-like section is fixed onto a gantry, and the horizontal projecting arm (boom) turns on a slewing table on the top of the column-like section. Therefore, the turn of the horizontal projecting arm is limited within the allowable twisting range of the double-belt conveyor in a tubular column of the column-like section. To cope with the twist of the double-belt conveyor in the column-like section, a group of pulleys has to be supported by many horizontal frame structures, of which the bottoms and peripheries have to be supported by rollers supported on flanges of a fixed tubular body. Thus, the whole structure becomes complex, the service lives of the belts are shortened by the twisting, dust is emitted from the gaps between the belts twisted, and considerable dust is generated on the exposed, extra-length part of the lower endless belt laterally extending along the upper surface of the quay.

In accordance with the above, another object of the present invention is to provide an unloader, which is free from the problems mention above, of which the driving pulleys do not slip due to powdered bulk cargo sticking to belt surfaces, over the whole length of which dust is not generated, wherein bulk cargo is not crushed and noises are not generated, and which is not clogged with bulk cargo.

Moreover, continuous loaders to load bulk cargoes carried forward by ground conveyors into the holds of ships are known. Also known are unloaders which can cope with both loading and unloading in accordance with different situations. The superstructure on the base body of this type of unloader can be replaced with a ship loader. The ship loader comprises a turnable boom extending laterally toward the sea, a telescopic chute pivotally mounted on the front end of the boom, and a belt conveyor installed over the lateral boom. Bulk cargo is carried forward by the boom conveyor and slides down on the chute into a ship's hold.

Another type of continuous loader/unloader is disclosed [for example, in the Japanese Utility Model Publication No. 74529/H3 (1991)]. The loader/unloader is a belt conveyor of the shape of an upside-down U comprising a horizontally conveying section and vertically conveying sections on both sides of the horizontal one. A vertical taking-in device comprising a flow conveyor is mounted on a bottom side of a vertically conveying section. An unloader discharge port and a loader discharge port are disposed in the upper and lower portions, respectively, of the taking-in device. The loader discharge port is provided with a lid freely openable and closable. To unload bulk cargo, bulk cargo is taken in by the taking-in device from the unloader discharge port through an unloader hopper and fed to the belt conveyor. To load bulk cargo, bulk cargo carried forward by the belt conveyor running now in the reverse direction is fed into the taking-in device from the loader discharge port through a loader hopper and discharged through the bottom of the taking-in device into a ship's hold. The lid of the loader discharge port is closed while the loader/unloader is unloading bulk cargo.

In case of the above conventional unloader convertible to a loader, it takes many man-hours to change its superstructure between an unloader and a ship loader. In addition, two superstructures have to be provided for each unloader, which costs a lot. In case of the above conventional loader/unloader, because both unloading and loading of bulk cargoes are performed through the taking-in device, its flow conveyor has to be operated not only during unloading but also during loading. Accordingly, it consumes extra power. Bulk cargo is not discharged smoothly while it is loading, and it may be clogged between the taking-in device and the loader discharge port with bulk cargo. Furthermore, it is difficult to discharge a large quantity of bulk cargo at a high speed.

In accordance with the above, still another object of the present invention is to provide an unloader which is free from the conventional problems mentioned above, of which the function can be changed over between loading and unloading by simple operation, which can discharge bulk cargo into the holds of ships easily and smoothly without being clogged and has simple structure, and of which the manufacturing cost is inexpensive.

SUMMARY OF THE INVENTION

According to the first aspect of the present invention, there is provided an unloader wherein a screw feeder is so mounted on a vertically conveying section that the former can, relative to the latter, ascend and descend freely from and to its mounted position and bulk cargo is fed into a receiving space of the vertically conveying section through a discharge port made in the screw casing of the screw feeder, the unloader characterized by (i) the discharge port which is positioned by discharge blades of the screw feeder and extended downward by the length of ascending/descending stroke of the screw feeder, and (ii) a blocking casing which is mounted on the vertically conveying section so that the outer surface of the screw casing comes in sliding contact with the blocking casing and the blocking casing closes generally the lower half of the discharge port while the screw feeder is in its mounted position.

According to the second aspect of the present invention, there is provided an unloader according to the first aspect characterized by (i) a top rubber cover, a bottom rubber cover, and a pair of side rubber covers which are mounted on a frame of the vertically conveying section so as to border the receiving space on the top, bottom, and both sides, (ii) a discharge-port guide plate which is mounted above the discharge port on the screw casing so as to be in sliding contact with the edge, on the screw casing's side, of the top rubber cover, (iii) a pair of discharge-port side plates which are mounted on both sides of the discharge port on the screw casing so as to be in sliding contact with the edges, on the screw casing's side, of the side rubber covers, and (iv) the discharge-port guide plate of which the longitudinal length is generally the same as the length of the ascending/descending stroke of the screw feeder.

According to the third aspect of the present invention, there is provided an unloader including (i) an upward-conveying section which is pivoted at its top and of which the bottom is inserted in bulk cargo, (ii) a downward-conveying section which is positioned above the bulk-cargo receiving portion of a discharge conveyor and turnable about its vertical axis, and (iii) a laterally conveying section comprising a boom which is pivotally mounted on the top of the downward-conveying section so as to be swingable up and down and which connects between the upward-conveying section and the downward-conveying section, the upward-, laterally-, and downward-conveying sections constituting a conveying path of the shape of an upside-down U, wherein (i) two endless belts are installed through the upward-, laterally, and downward-conveying sections, their carrying surfaces facing and overlapping each other, the two endless belt constituting a double-belt conveyor, (ii) the discharging end of the double-belt conveyor is positioned close to the bulk-cargo receiving portion of the discharge conveyor, and (iii) two end pulleys of the discharging end of the double-belt conveyor are differentiated from each other in height and drive the two endless belts.

According to the fourth aspect of the present invention, there is provided an unloader according to the third aspect, wherein (i) the downward-conveying section comprises a fixed cylindrical casing positioned close to the discharge conveyor, a slewing cylindrical casing supported freely turnably on the fixed cylindrical casing, and an end-pulley driving device mounted on a supporting frame in the slewing cylindrical casing, (ii) the discharging end of the double-belt conveyor is inserted in the slewing cylindrical casing and positioned close to the discharge conveyor, and (iii) the boom of the laterally conveying section is jointed on the top of the slewing cylindrical casing so as to be swingable up and down.

According to the fifth aspect of the present invention, there is provided an unloader comprising (i) a laterally conveying section supported on a slewing frame so as to be turnable and swingable up and down, (ii) a longitudinally conveying section pivotally mounted on the front end of the laterally conveying section so as to be swingable, (iii) a double-belt conveyor installed from the base, supported on the slewing frame, of the laterally conveying section to the bottom of the longitudinally conveying section, (iv) a bulk-cargo supplying unit disposed above the portion of the double-belt conveyor near the base of the laterally conveying section, and (v) a downward-conveying section disposed under the base of the laterally conveying section. The two end pulleys of the double-belt conveyor at the bottom of the longitudinally conveying section is differentiated from each other in height. The lower end pulley is supported in the longitudinally conveying section so as to allow the lower end pulley to move laterally as a whole, and a drive unit to drive the lower end pulley laterally is provided at the bottom of the longitudinally conveying section.

According to the sixth aspect of the present invention, there is provided an unloader according to the fifth aspect wherein the lower end pulley at the bottom of the longitudinally conveying section moves between a loading position almost directly under the upper end pulley and an unloading position where the belt of the lower end pulley takes an almost upright posture in the vicinity of the lower end pulley.

According to the seventh aspect of the present invention, there is provided an unloader according to the fifth or sixth aspect wherein the drive unit for driving the lower end pulley laterally has (i) guide rails for supporting and guiding the bearing units of the lower end pulley and (ii) oil-hydraulic cylinders connected to the bearing units.

According to the eighth aspect of the present invention, there is provided an unloader according to the fifth or sixth aspect wherein the drive unit for driving the lower end pulley laterally has (i) levers which support the bearing units of the lower end pulley and of which the tops are pivotally supported on a frame of the longitudinally conveying section, (ii) oil-hydraulic cylinders to swing the levers, and (iii) means for positioning and fixing the levers at a position for loading and a position for unloading.

The advantage offered by the first aspect of the invention is as follows. While the rocks of a ship are small, the screw feeder rests in its mounted, or lowest, position and generally the upper half of the discharge port faces the receiving space of the vertically conveying section. Therefore, the discharge blades can feed bulk cargo into the receiving space. In this state, generally the lower half of the discharge port is covered by the blocking casing. Therefore, no bulk cargo scatters outside. When the screw feeder is pushed up largely by the bottom of the ship on a rough sea, the discharge port goes up relative to the stationary vertically conveying section and generally the lower half of the discharge port comes to face the receiving space. Therefore, bulk cargo can be fed to the receiving space through generally the lower half of the discharge port. With this mechanism, bulk cargo can be unloaded from ships on a rough sea.

The advantage offered by the second aspect of the invention is as follows. Because the receiving space is completely isolated from the outside by the top, bottom, and side rubber covers, discharge-port guide plate, and discharge-port side plates, bulk cargo does not scatter outside. Besides, even while the screw feeder is moving up and down, the discharge-port guide plate and discharge-port side plates keep in contact with the top and side rubber covers. Therefore, the scattering of bulk cargo through the upper portion and side portions of the discharge port can be prevented.

The advantages offered by the third aspect of the invention are mainly as follows. Because the end pulleys of the discharging end of the double-belt conveyor are the driving pulleys of the two belts and in contact with the backs of the two belts, bulk cargo caught and carried between the two belts does not stick to the end pulleys and, therefore, the conventional problem of the slip of the driving pulleys does not occur. Because the end pulleys are differentiated from each other in height, bulk cargo can be discharged easily from between the two belts. Because bulk cargo is carried continuously from the base of the lateral boom through the downward-conveying section without using a chute, dust is not generated at the lateral-boom base and this unloader is free from such problems as clogging of and noises from such a chute. Because the discharge end of the double-belt conveyor is positioned near the discharge conveyor and bulk cargo is discharged directly onto the discharge conveyor without using a chute, the loader is free from such problems as crushing of bulk cargo and generation of noises and dust which may otherwise be caused by the fall of bulk cargo.

The advantages offered by the fourth aspect of the invention are mainly as follows. Because the lateral boom, the endless belts, and the end pulleys and their drive units at the bottom of the downward-conveying section turn together with the cylindrical slewing frame supported on the cylindrical frame, the unloader can turn very smoothly. Because bulk cargo is carried by a continuous double-belt conveyor through the upward-, laterally, and downward-conveying sections without transshipment, the unloader generates less dust and noise.

The advantages offered by the fifth aspect of the invention are mainly as follows. Bulk cargoes can smoothly be loaded and unloaded by running the double-belt conveyor of the unloader in the opposite directions. Besides, the loader is significantly economical compared with the conventional unloader of which the superstructure can be replaced with a ship loader. Moreover, the function of the unloader can be changed over between unloading and loading easily and quickly just by operating the device to move the lower end pulley at the bottom of the double-belt conveyor and operating the switch of the reversible belt-driving motors.

The advantage offered by the sixth aspect of the invention is as follows. Because the function of the unloader can be changed over between unloading and loading by shifting the lower end pulley between unloading and loading positions, both unloading and loading bulk cargoes can be performed efficiently.

The advantage offered by the seventh aspect of the invention is as follows. Because the movable end pulley is fixed by the guide rails, positional slippage of the movable end pulley does not occur during loading and unloading, enabling stable loading and unloading work.

The advantage offered by the eighth aspect of the invention is as follows. Because the movable end pulley is fixed by the positioning pins, positional slippage of the movable end pulley does not occur during loading and unloading, enabling stable loading and unloading work.

BRIEF DESCRIPTION OF THE DRAWINGS

The features and advantages of the present invention will become more clearly appreciated from the following description in conjunction with the accompanying drawings, in which:

FIG. 1(a) is an illustration of the workings of a screw feeder and a vertically conveying section embodying the first and second aspects of the present invention, the screw feeder being in its mounted, or lowest, position; and FIG. 1(b) is an illustration of the same, the screw feeder being in its top position;

in FIG. 21, the unloader is unloading the bulk cargo from a ship's hold toward the land side; and in FIG. 22, the unloader is loading bulk cargo from the land side into a ship's hold;

DETAILED DESCRIPTION OF THE PREFERRED EMBODIMENTS

With reference to the drawings, preferred embodiments of the present invention will now be described.

An unloader embodying the first and second aspects of the present invention will first be described.

Figure 2:
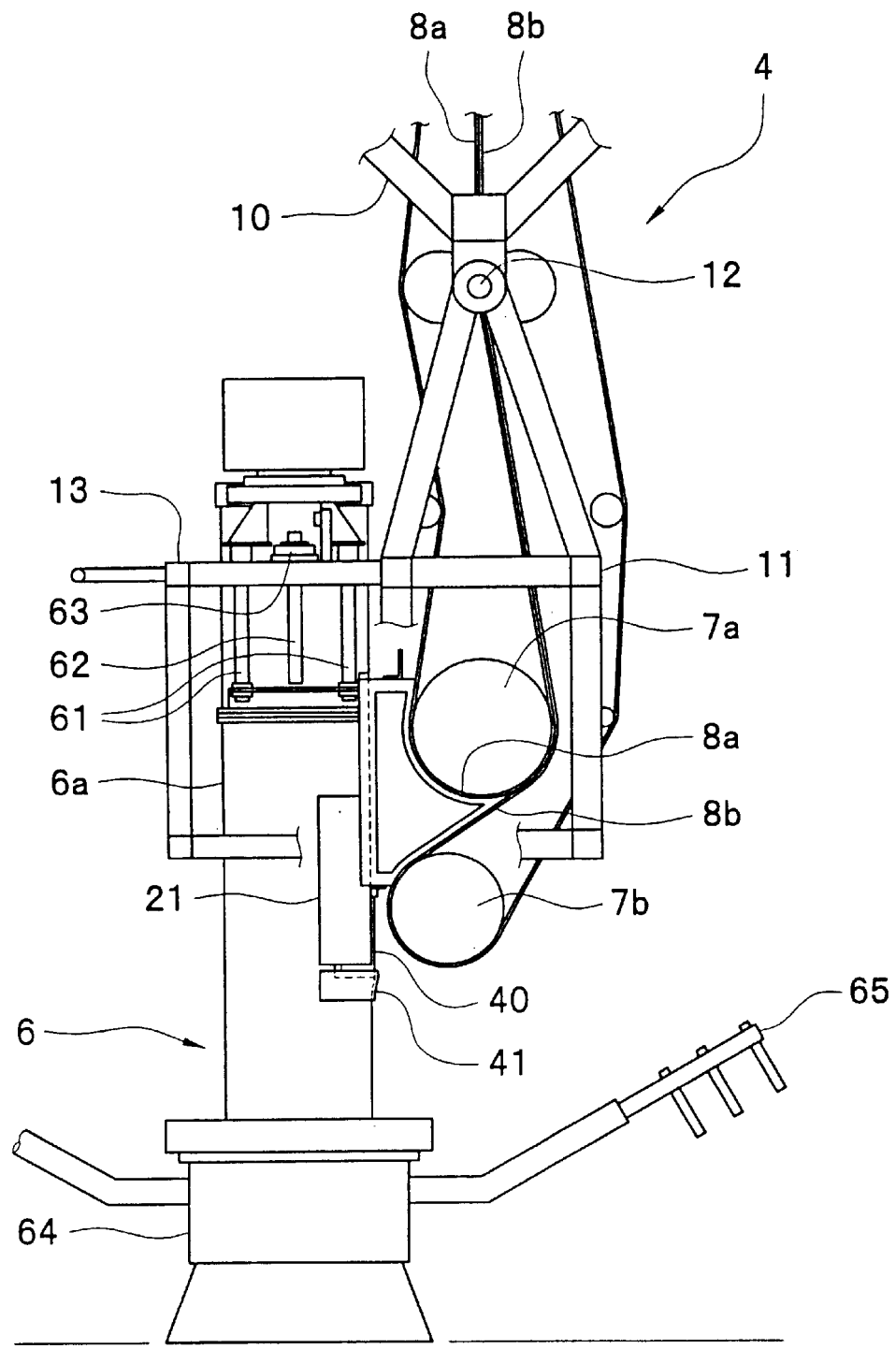
FIG. 2 is a side view of the screw feeder and the vertically conveying section of FIG. 1.

In FIG. 2, the numerals 4 and 6 indicate a vertically conveying section and a screw feeder.

A supporting frame 11 is hung swingably by a pin 12 from the bottom of the frame 10 of the vertically conveying section 4. A feeder-supporting frame 13 is fixed to a side of the supporting frame 11.

An upper tail pulley 7a and a lower tail pulley 7b, both in the shape of a tsuzumi, or Japanese hand drum, are freely journaled in the supporting frame 11. An upper belt 8a and a lower belt 8b are set on the upper tail pulley 7a and the lower tail pulley 7b, respectively, and run through the vertically conveying section 4. A receiving space 5 is formed between and in front of the upper and lower tail pulleys 7a and 7b. The upper and lower belts 8a and 8b catch therebetween and carry bulk cargo upward.

To carry bulk cargo forward from the top of the vertically conveying section 4, a conveyor may be provided along the lateral boom (not shown) from which the vertically conveying section is hung or the upper and lower belts 8a and 8b may be extended to the base end of the lateral boom. A known chute carries bulk cargo farther, toward the ground.

On each side of the screw feeder, long bolts 61 penetrating the feeder-supporting frame 13 and a rail 62 guided by a rail guide 63 on the feeder-supporting frame 13 are mounted on the screw casing 6a of the screw feeder 6 so that the screw feeder 6 can freely move up and down relative to the stationary vertically conveying section 4. In addition, any other elevation mechanisms may be adopted for the screw feeder 6.

The screw feeder 6 is given a stroke, of 500 mm for example, which can absorb almost the whole upward movement of the screw feeder 6 due to the rolling and pitching of ships on a rough sea.

As shown in FIG. 1, the screw feeder 6 comprises a generally cylindrical screw casing 6a and a screw 6b in the screw casing 6a. The screw 6b is driven by an electric motor or the like. The screw 6b comprises a screw shaft, a spiral blade 6c around the screw shaft, and paddle-like discharge blades 6d mounted on the top of the screw shaft. As shown in FIG. 2, the screw casing 6a is provided at its bottom with an excavating shell 64 which is driven by an electric motor or the like and has rakes 65 to scrape down bulk cargo. The rakes 65 are radially expansible and contractible to change the scraping radius.

In FIGS. 1(a) and 2, the screw feeder 6 is in its mounted, or lowest, position without being pushed up by the bottom of a ship. In FIG. 1(b), the screw feeder 6 is pushed up by the bottom of a ship.

Referring to FIGS. 3–8, the mechanism to feed bulk cargo from the screw feeder 6 to the vertically conveying section 4 will now be described in detail.

Figure 4:
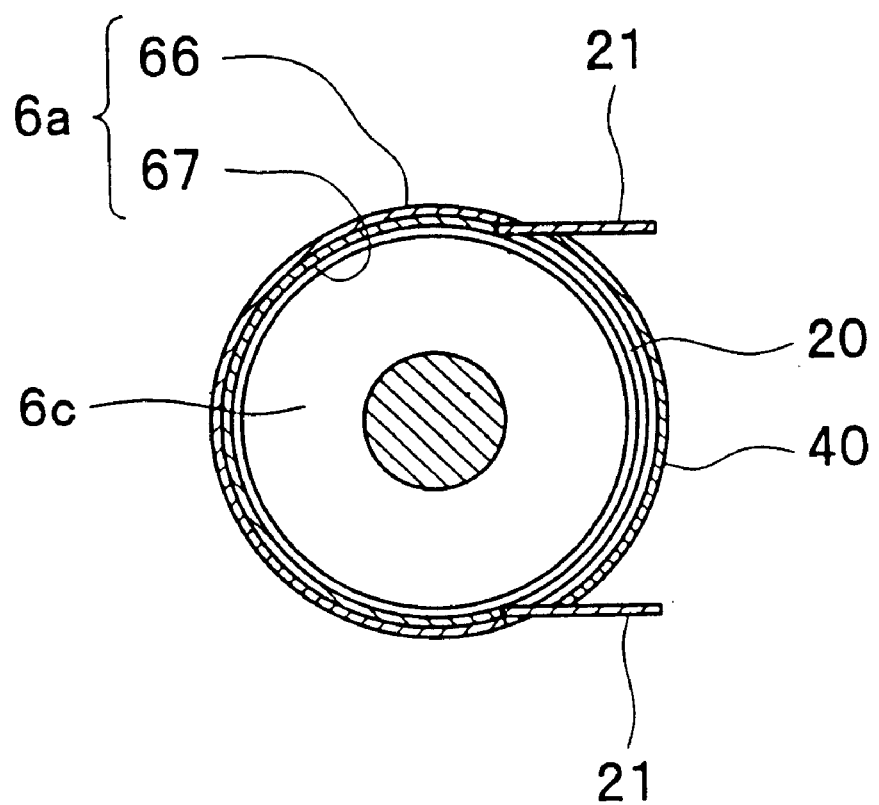
FIGS. 4, 5, and 6 are horizontal sectional views taken along the arrowed lines IV, V, and VI of FIG. 3, respectively.
Figure 7:
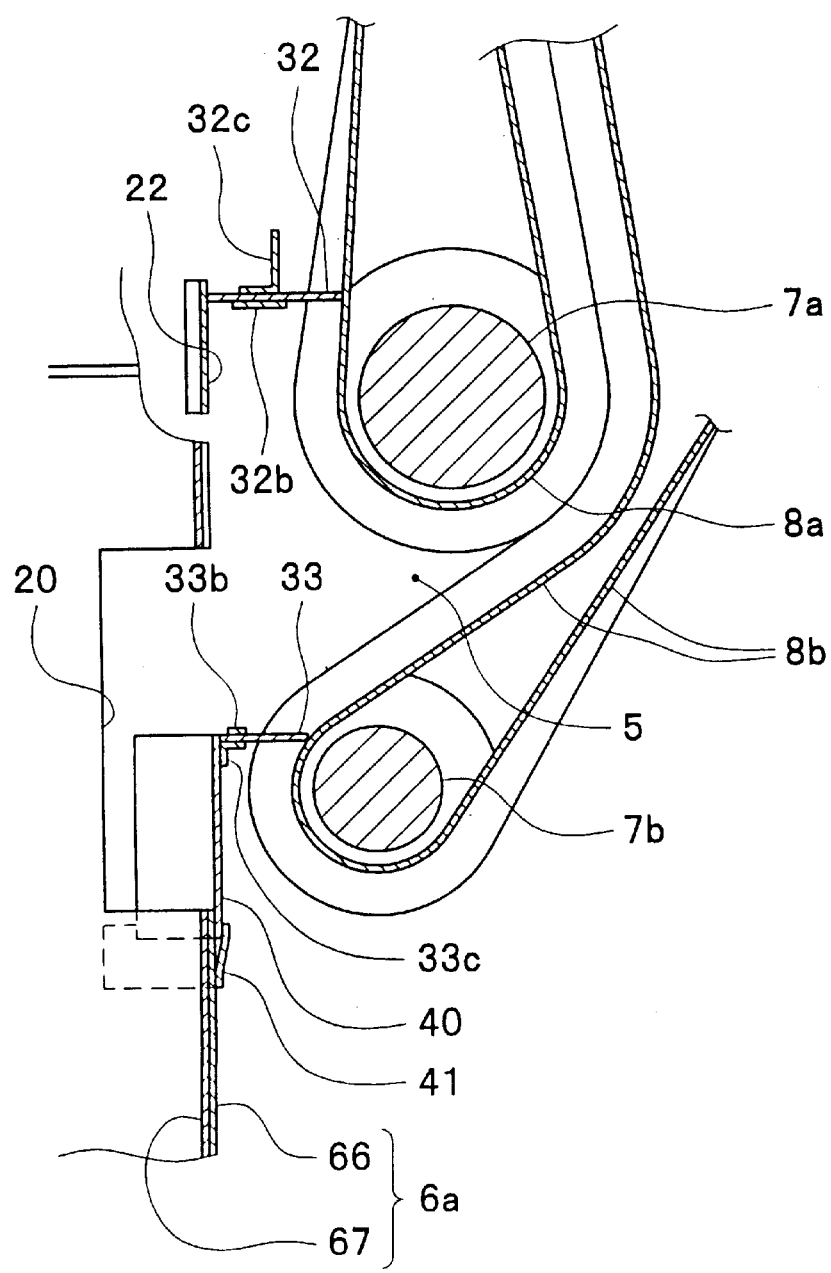
FIG. 7 is a vertical sectional view taken along the arrowed line VII of FIG. 5.

As shown in FIGS. 4 and 7, a discharge port 20 is made in the screw casing 6a. The discharge port 20 is made at a position and in size to allow the discharge blades 6d of the screw 6b to discharge bulk cargo through it into the receiving space 5 of the vertically conveying section 4 while the screw feeder 6 is in its mounted, or lowest, position. In addition, the discharge port 20 is extended downward by the length of stroke of the screw feeder 6 which is generally 500 mm or so. Because the width of the discharge port 20 is slightly smaller than the diameter of the screw casing 6a, the discharge port 20 presents the shape of an arc as seen from above the screw casing 6a.

The screw casing 6a comprises an outer cylinder 66 and a cylinder liner 67.

Figure 3:
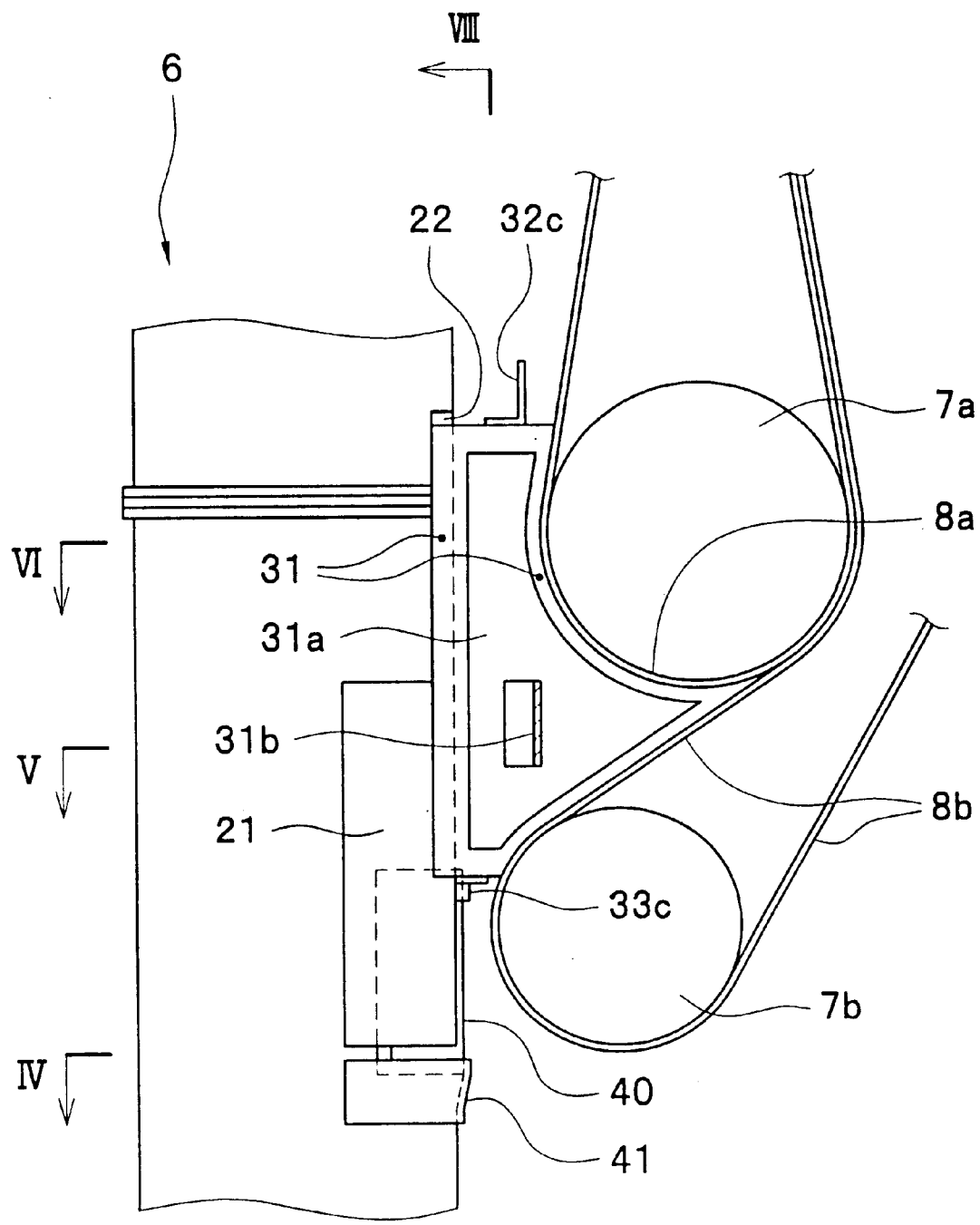
FIG. 3 is an enlarged side view of the bulk-cargo feeding mechanism portion of FIG. 2.
Figure 5:
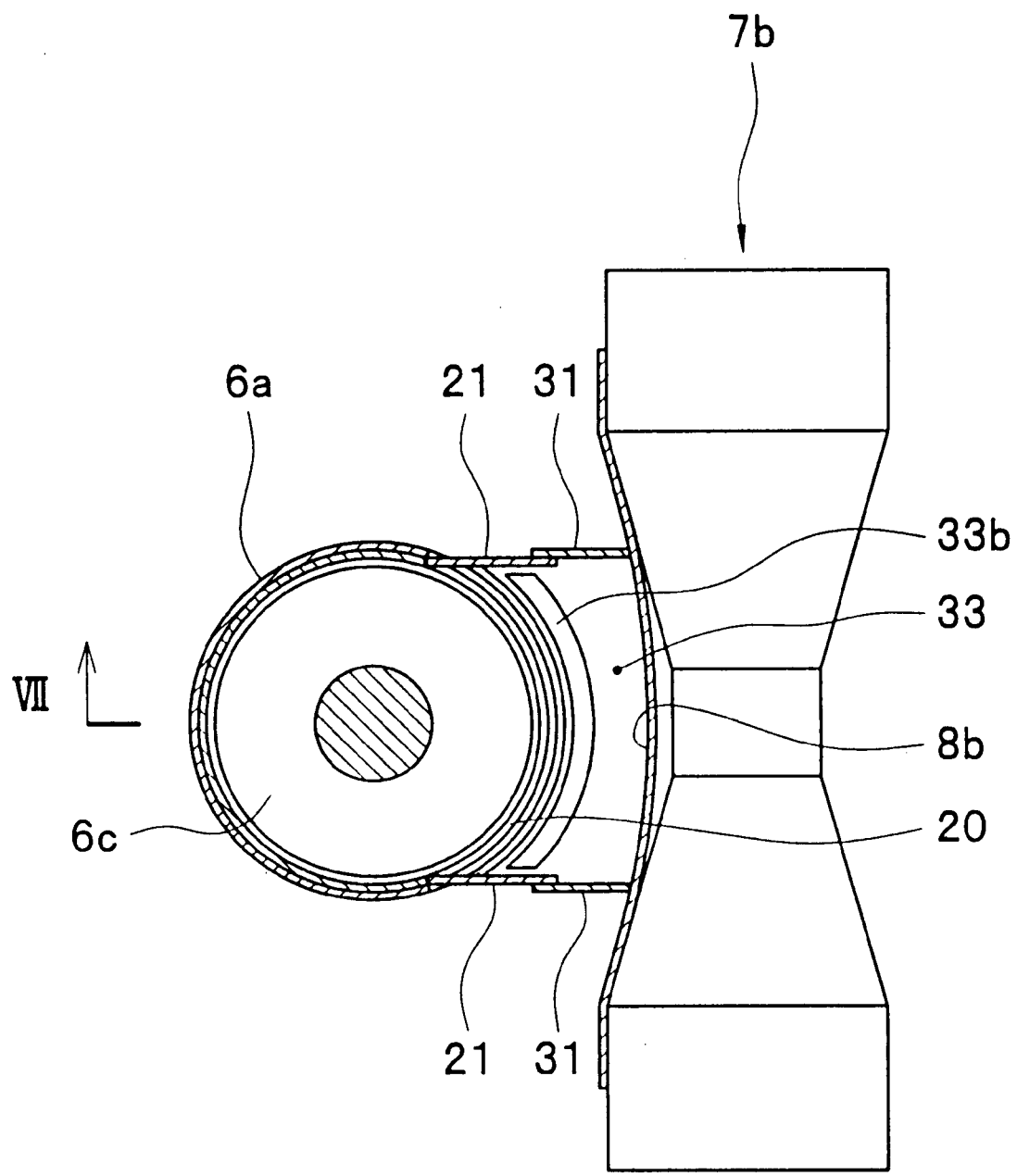
Figure 8:
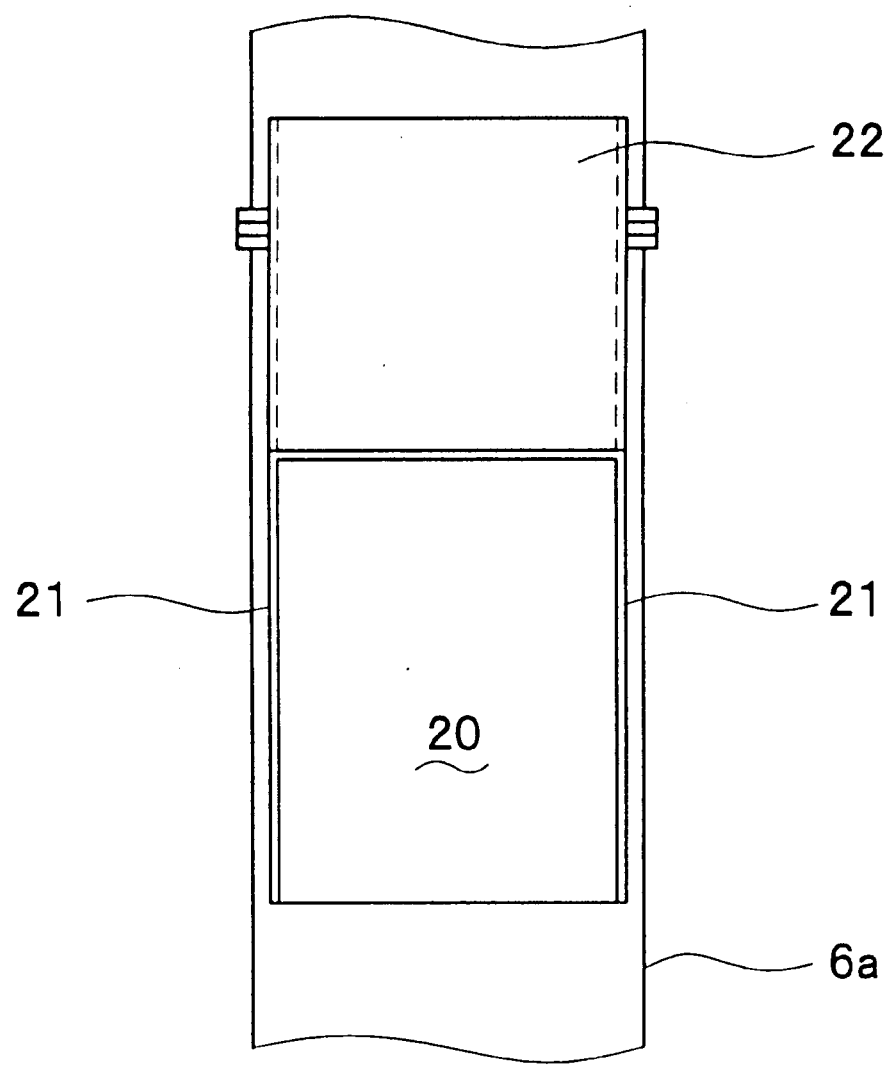
FIG. 8 is a view as seen in the direction of the arrowed line VIII of FIG. 3.

As shown in FIGS. 3–5, the discharge port 20 has discharge-port side plates 21 on both its sides to cover the side portions of the discharge port 20. Each discharge-port side plate 21 is a rectangular plate-like member. Besides, as is shown in FIGS. 6–8, a discharge-port guide plate 22 of the shape of a flat plate is provided above the discharge port 20.

Figure 6:
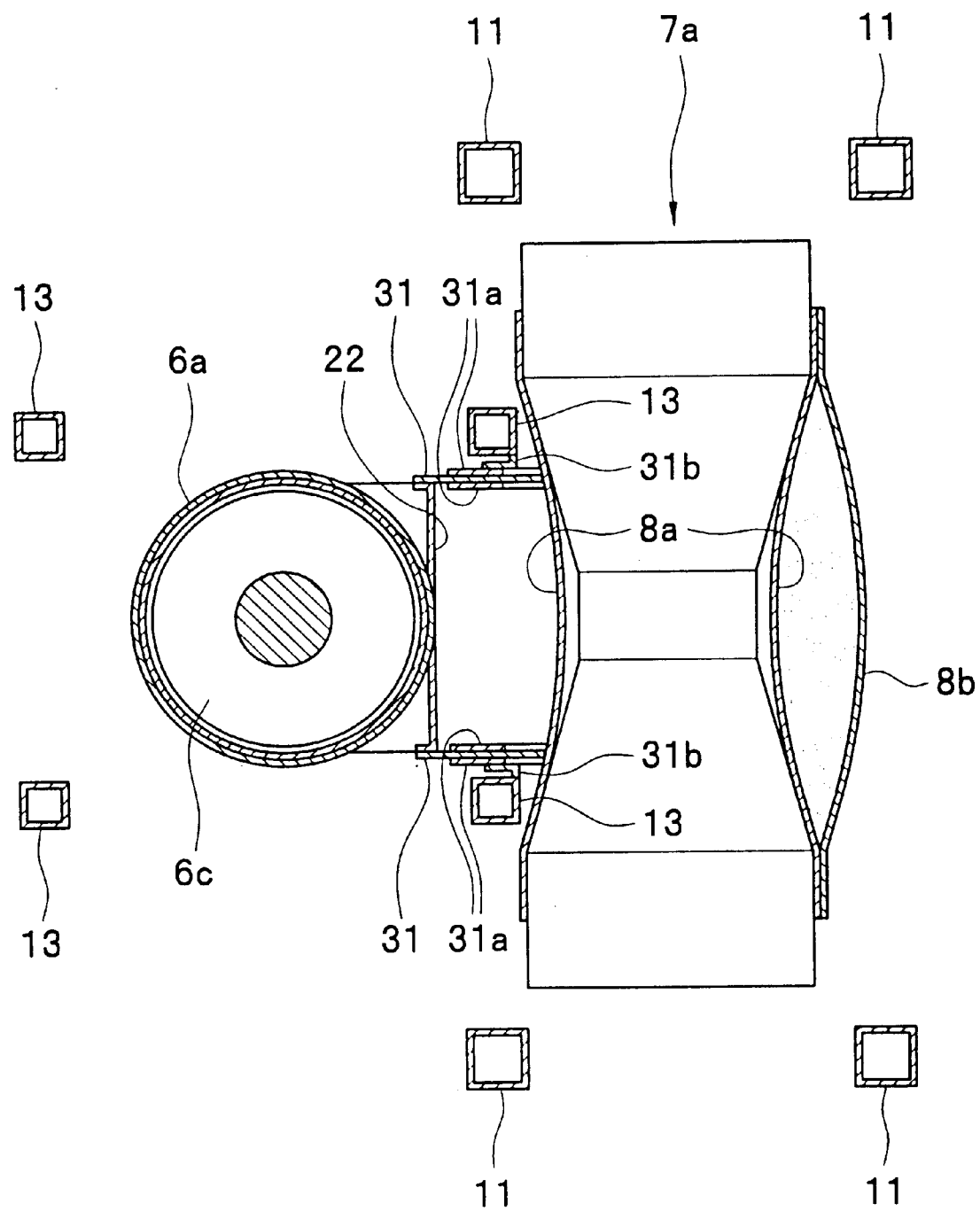

As shown in FIGS. 5–6, each of the upper and lower tail pulleys 7a and 7b has the shape of a tsuzumi, and each of the upper and lower belts 8a and 8b deforms on the corresponding tail pulley, sinking its middle portion. Bulk cargo is caught between the upper and lower belts 8a and 8b so deformed.

As shown in FIGS. 3 and 5–7, top, bottom, and side rubber covers 31–33 walling in the receiving space 5 and a blocking casing 40 closing generally the lower half of the discharge port 20 are mounted on the supporting frame 11 wherein the upper and lower tail pulleys 7a and 7b are journaled.

The top, bottom, and side rubber covers 31–33 are so arranged that they contact with the upper and lower belts 8a and 8b to wall in the receiving space 5 almost completely. Accordingly, the top, bottom, and side rubber covers 31–33 are made of plate-like rubber to prevent the upper and lower belts 8a and 8b from wearing.

As shown in FIGS. 3 and 6, the side rubber covers 31 and 31 are arranged on both sides of the receiving space 5, and each rubber cover 31 is held between two supporting plates 31a of steel, which are held by a bracket 31b mounted on the feeder-supporting frame 13.

Besides, as is shown in FIGS. 3 and 6, the right edge of each side rubber cover 31 is in contact with the upper and lower belts 8a and 8b. The upper portion of the left edge of each side rubber cover 31 is in right-angle contact with the discharge-port guide plate 22, and the lower portion of the same is positioned outside, and is in parallel contact with, the corresponding discharge-port side plate 21.

As shown in FIGS. 3 and 7, the top rubber cover 32 is held above the receiving space 5 by a supporting plate 32b and an angle bar 32c, which is mounted on the supporting frame 11.

As shown in FIG. 7, the right edge of the top rubber cover 32 is in contact with the surface of the upper belts 8a; the left edge, with the surface of the discharge-port guide plate 22.

As shown in FIGS. 5 and 7, the bottom rubber cover 33 is held under the receiving space 5 by a supporting plate 33b and an angle bar 33c, which is mounted on the supporting frame 11.

As shown in FIGS. 5 and 7, the right edge of the bottom rubber cover 33 is in contact with the surface of the lower belt 8b.

As shown in FIGS. 3, 4, and 7, the blocking casing 40, which is held by the angle bar 33c mounted on the supporting frame 11, is to close generally the lower half of the discharge port 20. Namely, the blocking casing 40 is fixed relative to the vertically conveying section 4. The blocking facing 40 has a height a little larger than half the height of the discharge port 20 and the shape of an arc as seen from above it, and is in sliding contact with the outer surface of the screw casing 6a. In FIG. 7, because the discharge-port side plates 21 are omitted, gaps can be observed between the side edges of the discharge port 20 and the side edges of the blocking casing 40, but the gaps are actually closed by the discharge-port side plates 21. Besides, a sealing rubber 41 is attached on the bottom of the blocking casing 40 to make its contact with the screw casing 6a closer and thereby prevent bulk cargo from scattering.

As described above, in this embodiment, the receiving space 5 is bordered by the top, bottom, and side rubber covers 31–33 on the top, bottom, and both sides, and the gap between the discharge port 20 and the top, bottom, and side rubber covers 31–33 is closed by the discharge-port side plates 21 and the blocking casing 40. Thus, bulk cargo can be fed from the screw feeder 6 to the receiving space 5 between and in front of the upper and lower tail pulleys 7a and 7b without scattering any bulk cargo.

In FIG. 1(a), the screw feeder 6 is in its mounted, or lowest, position without being pushed up by the bottom of the ship. In this state, generally the lower half of the discharge port 20 is closed by the blocking casing 40, and the discharge blades 6d face the receiving space 5 between and in front of the upper and lower tail pulleys 7a and 7b through generally the upper half of the discharge port 20. Accordingly, bulk cargo can be fed by the discharge blades 6d into the receiving space 5.

In FIG. 1(b), the screw feeder 6 is pushed up 500 mm or so by the bottom of the ship. In this condition, although the discharge port 20 is in its top position, the upper portion of the spiral blade 6c is facing the receiving space 5 through generally the lower half of the discharge port 20. Thus, bulk cargo can be fed by the upper portion of the spiral blade 6c into the receiving space 5. Although generally the upper half of the discharge port 20 faces the upper tail pulley 7a, bulk cargo does not dash against the upper tail pulley 7a and fall outside because it is fed into the receiving space 5 through generally the lower half of the discharge port 20.

Thus, bulk cargo can be fed to the vertically conveying section 4 without scattering any bulk cargo outside even while the ship is rolling and pitching badly and the screw feeder 6 is moving up and down largely.

An unloader embodying the third and fourth aspects of the present invention will now be described. The function of the unloader can easily be changed over between unloading and loading.

Figure 9:
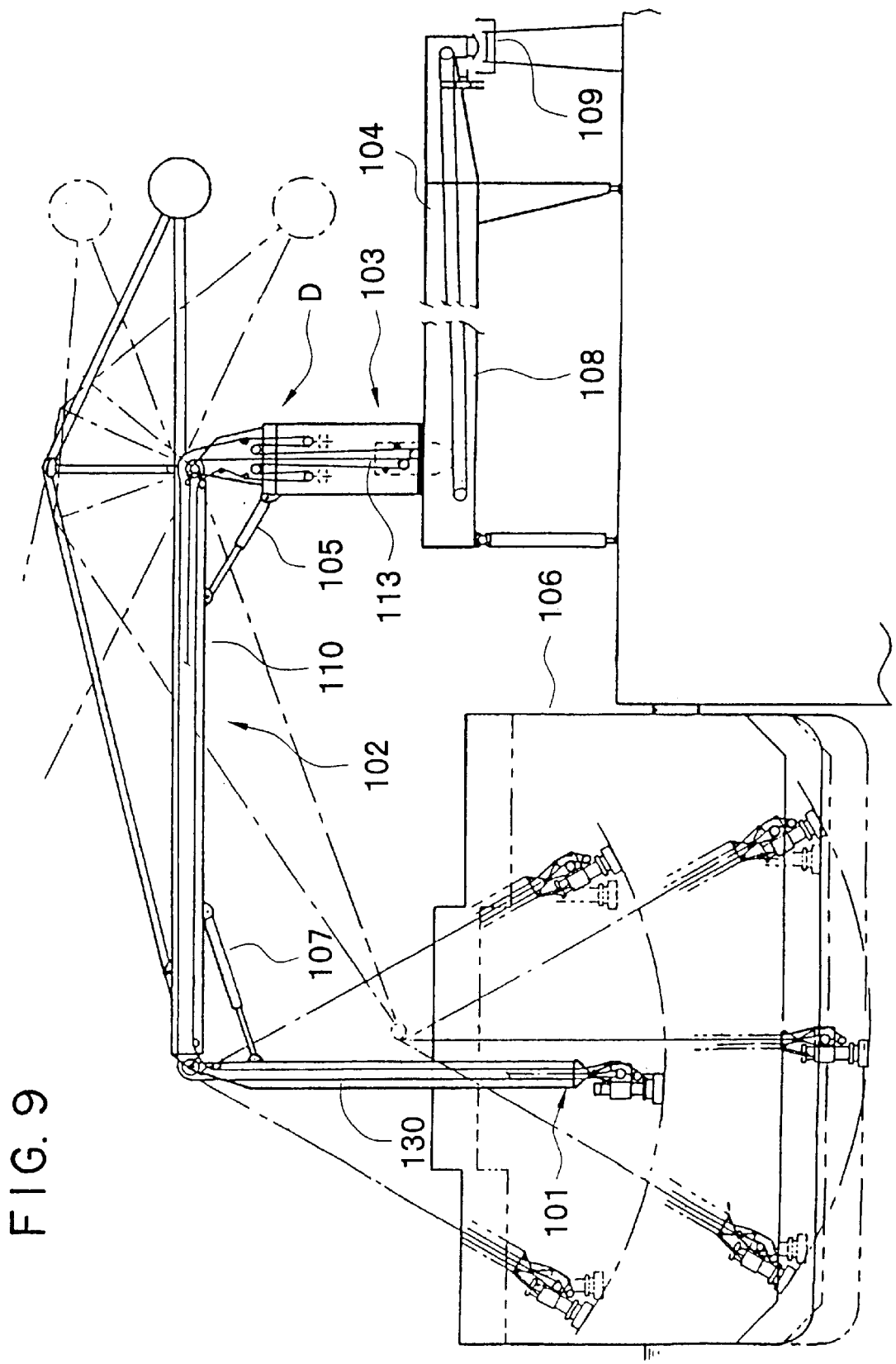
FIG. 9 is a general side view of an unloader embodying the third and fourth aspects of the present invention.

FIG. 9 is a general side view of the unloader. A downward-conveying section 103 to carry bulk cargo downward is mounted turnably on a gantry 104 which runs on the quay. A laterally conveying section 102 extending toward a ship 106 at its moorings is pivotally mounted by a pin on the top of the downward-conveying section 103 so as to be swingable up and down. Mounted pivotally on the front end of the laterally conveying section 102 is an upward-conveying section 101 which is to be inserted in a hold of the ship and can be swung in the vertical plane which includes the axis of the laterally conveying section 102. An oil-hydraulic cylinder 105 is provided between the downward-conveying section 103 and the laterally conveying section 102 to raise and lower the laterally conveying section 102. An oil-hydraulic cylinder 107 is provided between the laterally conveying section 102 and the upward-conveying section 101 to swing the upward-conveying section 101. Besides, mounted on the gantry 104 is a discharge conveyor 8 which is positioned close to the bottom of the downward-conveying section 103 and extends toward the land side. A ground conveyor 109 is positioned under the terminal of the discharge conveyor 108. As shown in FIG. 9, the discharge conveyor 108 is installed in the upper frame of the gantry 104 so that the discharge conveyor 108 is covered by the upper frame.

The laterally conveying section 102 has a lateral boom 110 to carry and support a double-belt conveyor to be described later. The base of the lateral boom 110 is jointed to a slewing frame (to be described later) of the downward-conveying section 103. A longitudinal boom 130 of the upward-conveying section 101 is pivotally mounted on the front end of the lateral boom 110. Two endless belts are installed, their carrying surfaces facing and overlapping each other, from the bottom of the upward-conveying section 101 through the laterally conveying section 102 to the bottom of the downward-conveying section 103, constituting a double-belt conveyor of the shape of an upside-down U. A screw feeder unit F is pivotally mounted close to the bottom of the double-belt conveyor in the upward-conveying section 101, to take bulk cargo into the upward-conveying section 101.

Figure 10:
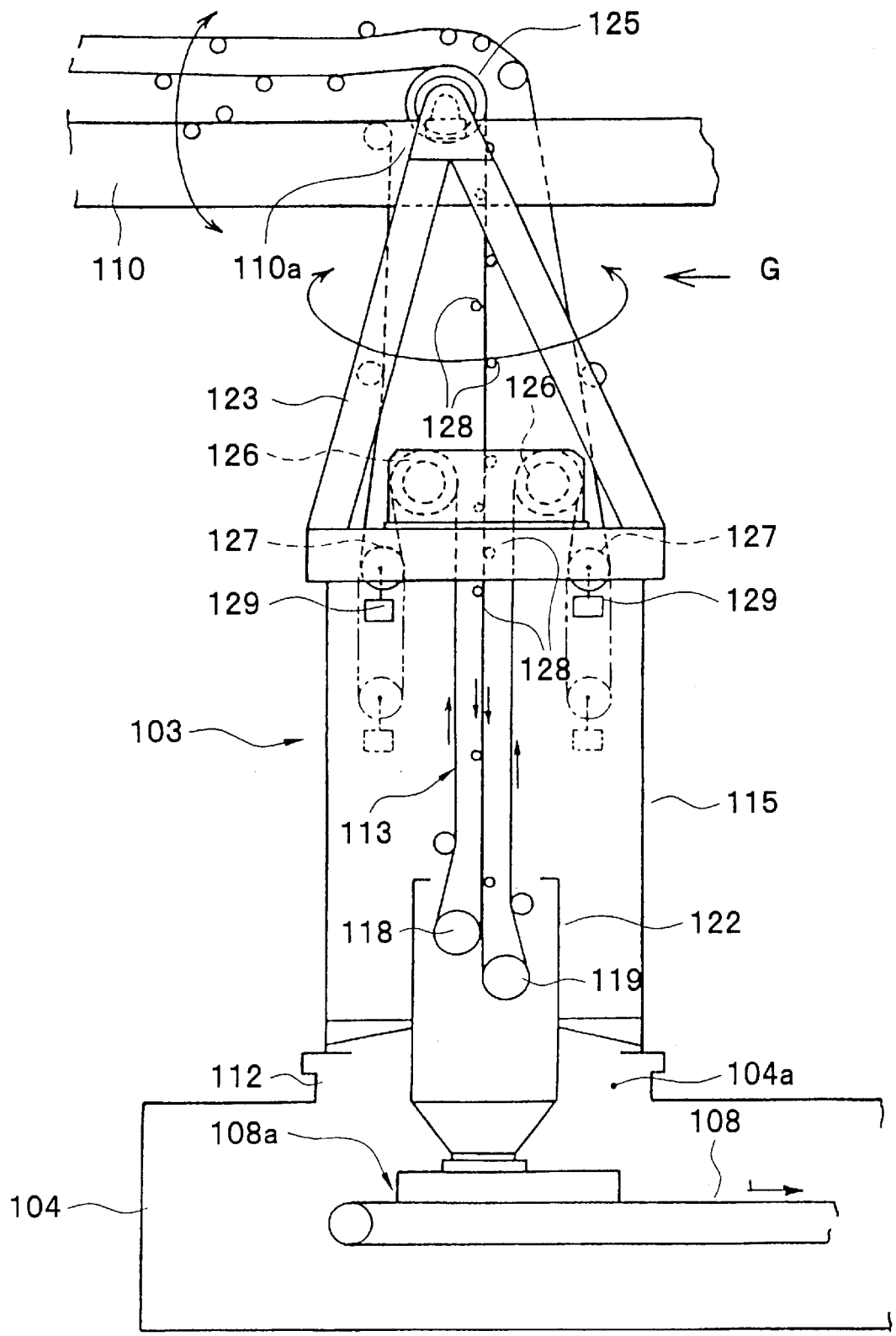
FIG. 10 is an enlarged, partially sectional view of the portion D, or the downward-conveying section, of FIG. 9.
Figure 11:
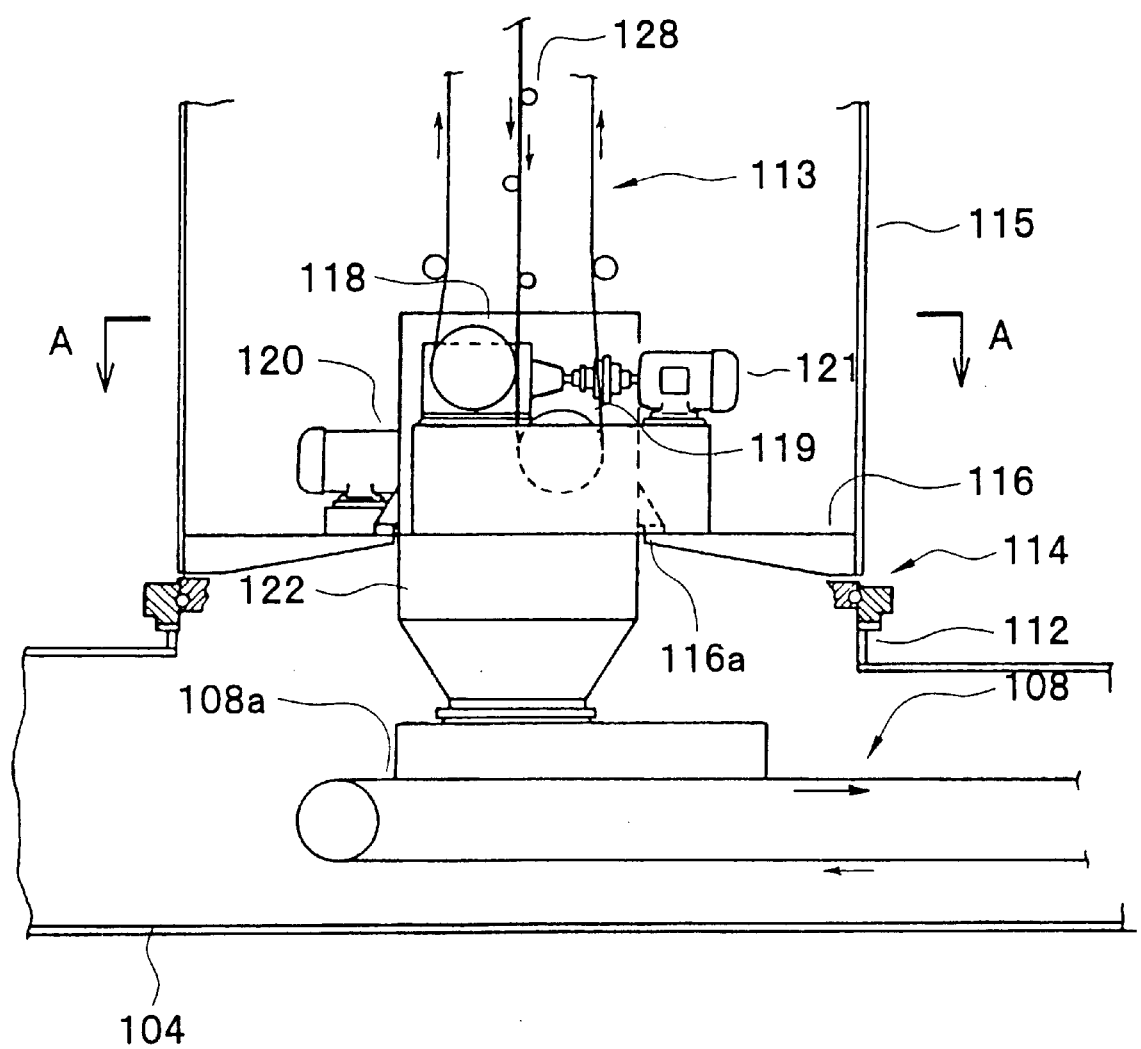
FIG. 11 is an enlarged, partially sectional side view of the portion D, or a belt-pulley driving unit at the bottom of the downward-conveying section and the lower part of a slewing frame of the same section, of FIG. 9.
Figure 12:
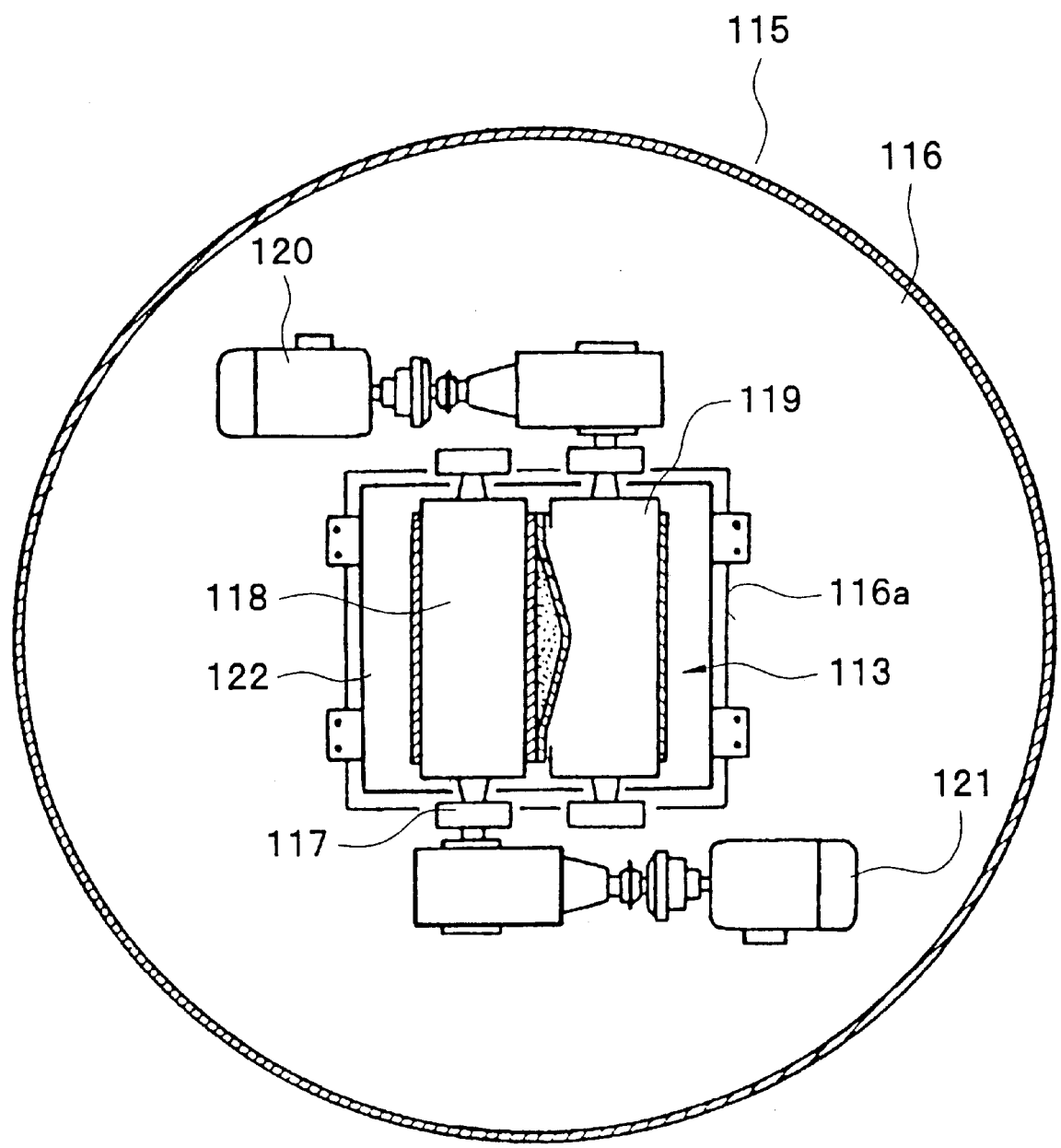
FIG. 12 is a horizontal sectional view taken along the arrowed line A—A of FIG. 11.

FIGS. 10 and 11 are enlarged views of the portion indicated by D in FIG. 9. In particular, FIG. 10 is a side view of the downward-conveying section 103, and FIG. 11 is a side view of a belt-pulley driving unit provided at the bottom of the downward-conveying section 103 and the lower part of a slewing frame of the downward-conveying section 103. FIG. 12 is a horizontal sectional view taken along the arrowed line A—A of FIG. 11. Referring to these Figures, the structure of the downward-conveying section 103 will now be described. A cylindrical frame 112 is provided on the gantry 104, and an opening 104a is made at their joint. The bulk-cargo receiving portion 108a of the discharge conveyor 108 is positioned directly under the opening 104a. A slewing frame 115 is supported by a bearing 114 on the cylindrical frame 112. Fixed inside the bottom of the slewing frame 115 is an end plate 116 with an opening 116a to let through the double-belt conveyor 113. End pulleys 118 and 119 of the double-belt conveyor 113 are bearing mounted by brackets 117 on the end plate 116. As shown in FIGS. 10 and 11, the end pulleys 118 and 119 are differentiated from each other in height. Drive units 120 and 121 to drive the end pulleys 118 and 119, respectively, are mounted on the end plate 116. The end plate 116 and the end pulleys 118 and 119 of the double-belt conveyor 113 are positioned near the discharge conveyor 108, and a dustproof cover 122 is provided to surround the bottom portion of the double-belt conveyor 113, from above the end pulleys 118 and 119 down to near the upper surface of the discharge conveyor 108.

The features of the third and fourth aspects of the present invention will now be described. In the aspects of the present invention, it is intended to reduce the slippage between the two endless belts and their driving pulleys by letting the peripheries of the driving pulleys contact with the backs of the two endless belts. On the other hand, it is preferable to position such driving pulleys, which require drive units, as near the gantry 104 as possible. If such driving pulleys are positioned at the bottom of the longitudinal boom 130, greater strength is required of the longitudinal boom 130 and the lateral boom 110. The place where the above requirements are met is the place of the end pulleys 118 and 119. Besides, the end pulleys 118 and 119 are differentiated from each other in height to facilitate the discharge of bulk cargo from between the two belts.

Figure 13:
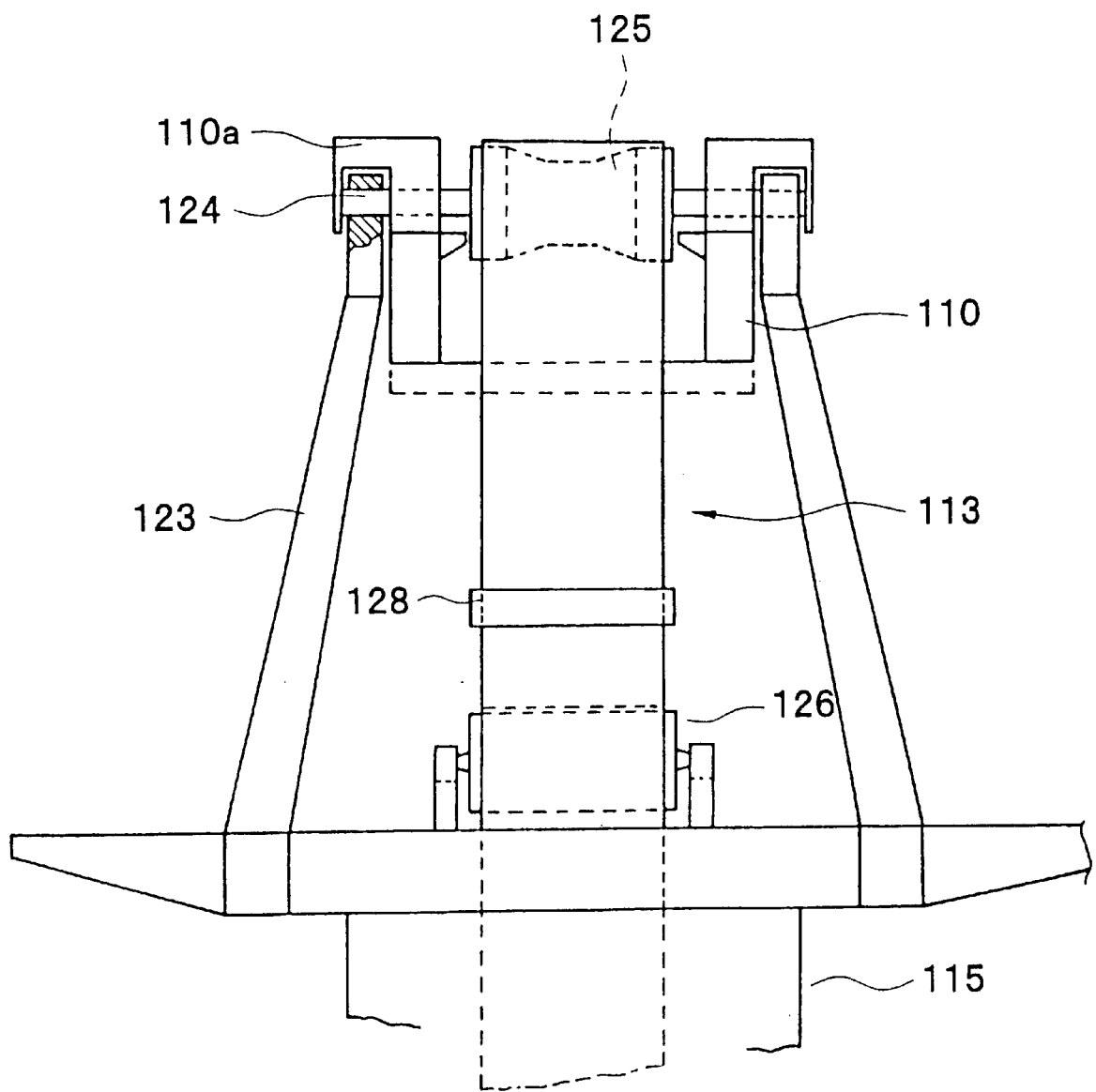
FIG. 13 is a side view of the supporting structure for the lateral boom and the tsuzumi-like pulley on the top of the downward-conveying section as seen in the direction G of FIG. 10.

A tower-like, lateral-boom supporting structure 123 is fixedly mounted on the cylindrical slewing frame 115. The base 110a of the lateral boom 110 is pivotally mounted by a pin 124 on the top of the lateral-boom supporting structure 123. As shown in FIG. 13, a pulley 125 of the shape of a tsuzumi, or Japanese hand drum, is journaled on the top of the lateral-boom supporting structure 123, preferably given a rotation axis coincidental with the axis of the lateral boom's base pin 124. The "carrying" (opposite of "return") sides of the two endless belts run, overlapping each other, around the tsuzumi-like pulley 125 and downward. Then, the two belts run around the end pulleys 118 and 119, respectively, to enter their return paths. The return side of each belt runs around a pulley 126 and a tension pulley 127, both journaled in the base of the lateral-boom supporting structure 123, toward the laterally conveying section 102. In order to prevent bulk cargo from spilling from between the two belts during the downward path from the tsuzumi-like pulley 125 on the top of the lateral-boom supporting structure 123 to the end pulleys 118 and 119, a number of rollers 128 are arranged zigzag, as shown in FIG. 10, along the two belts running downward together to hold down the right and left edges of the belts together from both sides. Suspended from each tension pulley 127 is a weight 129, and they move up and down to always exert an appropriate tension on the belt.

Figure 14:
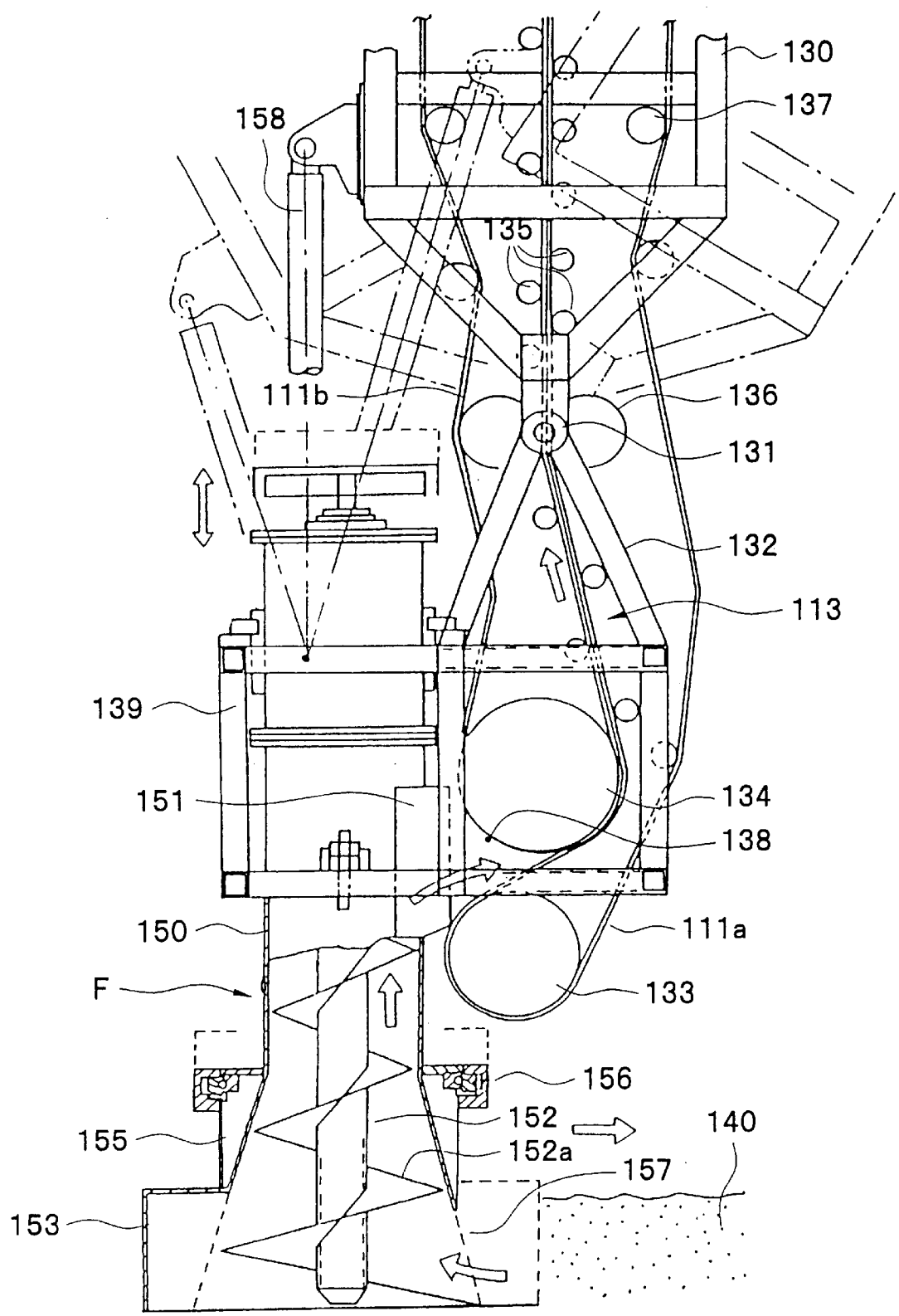
FIG. 14 is a side view of the screw feeder and the lower portion of the longitudinal boom of FIG. 9.

The two endless belts overlapping each other on the lateral boom 110 are led, via pulleys (not shown) at the front end of the lateral boom 110, down along the longitudinal boom 130 to its bottom. The longitudinal boom 130 is pivotally hung from the front end of the lateral boom 110. Mounted at the bottom of the longitudinal boom 130 is a screw feeder unit F, which takes in and feeds bulk cargo to the double-belt conveyor 113 in the upward-conveying section 101. Referring to FIG. 14, the screw feeder unit F and the structure of the bottom of the upward-conveying section 101 will be described below.

Mounted pivotally on a pin 131 at the bottom of the longitudinal boom 130 is a supporting frame 132, wherein end pulleys 133 and 134 for the two endless belts are positioned up and down and journaled. The endless belt 111a set on the lower end pulley 133 runs under the other endless belt in the laterally conveying section 102, and the endless belt 111b set on the upper end pulley 134 runs on the endless belt 111a in the laterally conveying section 102. A number of rollers 135 are arranged zigzag, as shown in FIG. 14, along the belts 111a and 111b running upward together. These rollers 35 are to hold down the right and left edges of the belts 111a and 111b together from both sides. Rollers 136 and belt-supporting rollers 137 are arranged to form the front portion of the double-belt conveyor 113 into the shape shown in FIG. 14. The upper and lower end pulleys 134 and 133 define a bulk-cargo receiving space 138 between and in front of them.

A feeder-supporting frame 139 is positioned close to the receiving space 138 between and in front of the end pulleys 134 and 133 and joined to a side of the end-pulley supporting frame 132 which is pivotally hung from the bottom of the longitudinal boom 130. The outer cylinder 150 of the screw feeder unit F is supported by the feeder-supporting frame 139. A discharge port 151 is provided on the outer cylinder 150, halfway in its height, in front of the receiving space 138 defined by the end pulleys 133 and 134. A screw shaft 152 with a screw blade 152a is set in the outer cylinder 150. The upper portion of the screw shaft 152 is journaled in bearings held by the outer cylinder 150 and driven by an electric motor (not shown) mounted on the outside of the upper portion of the outer cylinder 150. An excavating shell 155 with excavating blades 153 is supported by a turn-table bearing 156 at the bottom of the outer cylinder 150. The excavating shell 155 is rotated, in the opposite direction to the screw shaft 152, by an oil hydraulic motor (not shown), which is supported by brackets (not shown) provided on the bottom portion of the outer cylinder 150. By rotating the excavating shell 155 in the opposite direction to the screw shaft 152, the bulk cargo 140 in the hold can be taken in through openings 157 toward the screw blade 152a.

A posture-retaining oil-hydraulic cylinder 158 is pivotally connected between a bottom side of the longitudinal boom 130 and the feeder-supporting frame 139. The end pulleys 133 and 134 and the screw feeder unit F can be swung around the pin 131 by the posture-retaining oil-hydraulic cylinder 158. Thus, when the angle of elevation of the lateral boom 110 is changed, the screw feeder unit F can be corrected into a vertical posture. In addition to the above screw feeder unit F, any devices which can take in deposited loose stuff and feed it into the receiving space 138 between and in front of the end pulleys 133 and 134 of the double-belt conveyor 113, for example a paddle-type feeder, can be adopted. Besides, although a cylindrical frame 112 is provided on the gantry 104 in the above embodiment, the thrust bearing 114 may be mounted directly on the gantry 104.

Bulk cargo fed from the discharge port 151 of the screw feeder unit F into the receiving space 138 at the bottom of the double-belt conveyor 113 in the upward-conveying section 101 is caught between the two belts 111a and 111b and carried upward and through the laterally conveying section 102 and farther, via the lateral-boom base 110a, through the downward-conveying section 103 by the double-belt conveyor 113 in the slewing frame 115 and the cylindrical frame 112, and discharged from between the end pulleys 118 and 119 of the double-belt conveyor 113 onto the discharge conveyor 108 to be carried farther more to the ground conveyor 109.

An unloader embodying the fifth to eighth aspects of the present invention will now be described.

Figure 15:
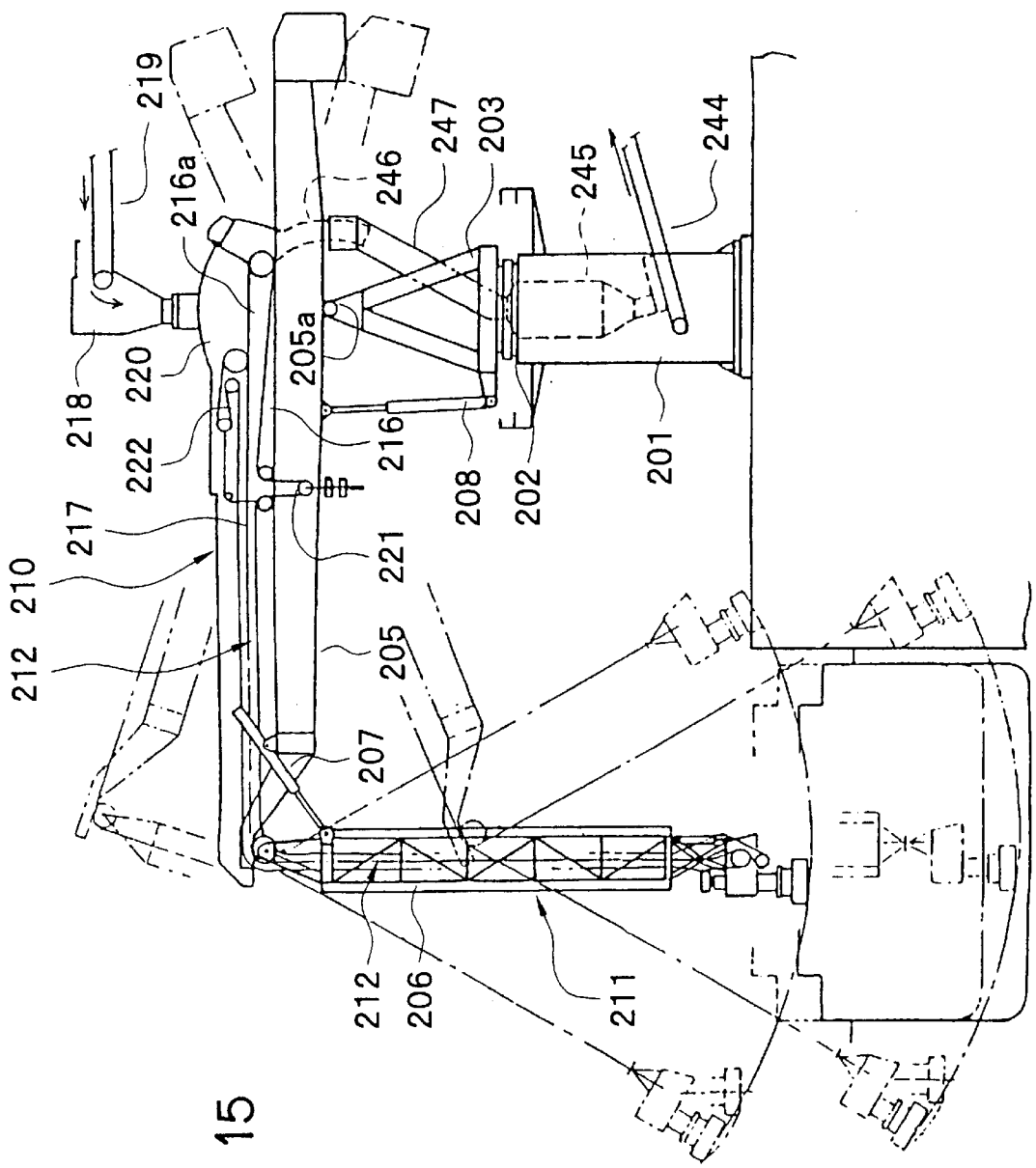
FIG. 15 is a general side view of an unloader embodying the fifth to eighth aspects of the present invention.

FIG. 15 is a general side view of the unloader. A cylindrical prop 120 is installed on a quay, and a slewing frame 203 is supported on a slewing gear 202 provided on the prop 201. The numeral 210 indicates a laterally conveying section which has a lateral boom 205. The lateral boom 205 is mounted on the top of the slewing frame 203 so as to be swingable up and down relative to the slewing frame 203. An oil-hydraulic cylinder 208 is connected between the bottom portion of the slewing frame 203 and the lateral boom 205 to swing the laterally conveying section 210 up and down. The numeral 211 indicates a longitudinally conveying section, which has a longitudinal boom 206 mounted by a pivot on the front end of the lateral boom 205. An oil-hydraulic cylinder 207 is connected between the lateral boom 205 and the longitudinal boom 206 to swing the longitudinal boom 206, or the longitudinally conveying section 211, about the pivot of the front end of the lateral boom 205.

From the bottom of the longitudinal boom 206 through to near the base portion of the lateral boom 205, the base portion being the portion supported by a pivot 205a on the slewing frame 203, two endless belts are installed, their carrying surfaces facing and overlapping each other, the two endless belts constituting a double-belt conveyor 212. In the immediate vicinity of the end pulleys of the double-belt conveyor 212 at the bottom of the longitudinally conveying section 211, a screw feeder unit F is supported by an end-pulley supporting frame. The longitudinally conveying section 211 is constituted by the longitudinal boom 206, double-belt conveyor 212, and screw feeder unit F. The laterally conveying section 210 is constituted by the lateral boom 205 and the double-belt conveyor 212. The end pulleys at the bottom of the longitudinally conveying section 211 and the screw feeder unit F will be described in detail later, referring to infra FIG. 16.

In the laterally conveying section 210, the lower endless belt 216 is extended longer than the upper endless belt 217 toward the rear of the laterally conveying section 210. Accordingly, the carrying surface 216a of the extra length of the lower endless belt 216 is exposed upward. A bulk-cargo feeding chute 218 is disposed above the exposed carrying surface 216a of the lower endless belt 216. The discharging end of a ground belt conveyor 219 for loading is inserted in the upper portion of the bulk-cargo feeding chute 218. The bulk cargo carried forward by the ground conveyor 219 is fed through the bulk-cargo feeding chute 218 onto the exposed carrying surface 216a of the lower endless belt 216. Then, the bulk cargo is caught between the upper and lower endless belts 217 and 216 running in the loading direction and carried toward the longitudinally conveying section 211. The exposed carrying surface, or the bulk-cargo feeding part for loading, 216a of the lower endless belt 216 is covered by a skirt 220 disposed under the bulk-cargo feeding chute 218 so as to prevent bulk cargo from spilling sideways. The upper and lower endless belts 217 and 216 are provided with belt-tension adjusting mechanisms 222 and 221, respectively.

A discharging belt conveyor 244 is inserted in the cylindrical prop 201, and a discharge chute 245 is disposed above the receiving portion of the discharging belt conveyor 244. The top of the discharge chute 245 faces a central through opening of the slewing gear 202. The lateral boom 205 has a bent chute 246 which is positioned close to the rear end of the lower endless belt 216. The bent chute 246 has the shape of an arc of which the center is the pivot 205a for the lateral boom 205. The bottom of the bent chute 246 is inserted loosely into the top portion of a slant chute 247, which is connected to the top of the discharge chute 245 in the cylindrical prop 201. When the lateral boom 205 swings up and down, the bent chute 246 moves in a circular path about the pivot 205a for the lateral boom 205, the bottom of the bent chute 246 staying in the slant chute 247.

While the double-belt conveyor 212 is running in the unloading direction, bulk cargo is carried toward the rear end of the double-belt conveyor 212 (toward the base portion of the lateral boom 205) and is fed from the exposed carrying surface 216a into the bent chute 246. Then, bulk cargo goes through the slant chute 247 and the discharge chute 245 to be discharged onto the discharging belt conveyor 244, which carries bulk cargo toward the ground side. The slant chute 247 is supported by the slewing frame 203. When the lateral boom 205 with the bent chute 246 turns, the slant chute 247 turns together with the slewing frame 203, all the four components behaving in one. However, the bottom of the slant chute 247 is positioned at the central through opening of the slewing gear 202, the flow of bulk cargo is not disturbed by the turn of the lateral boom 205.

Figure 16:
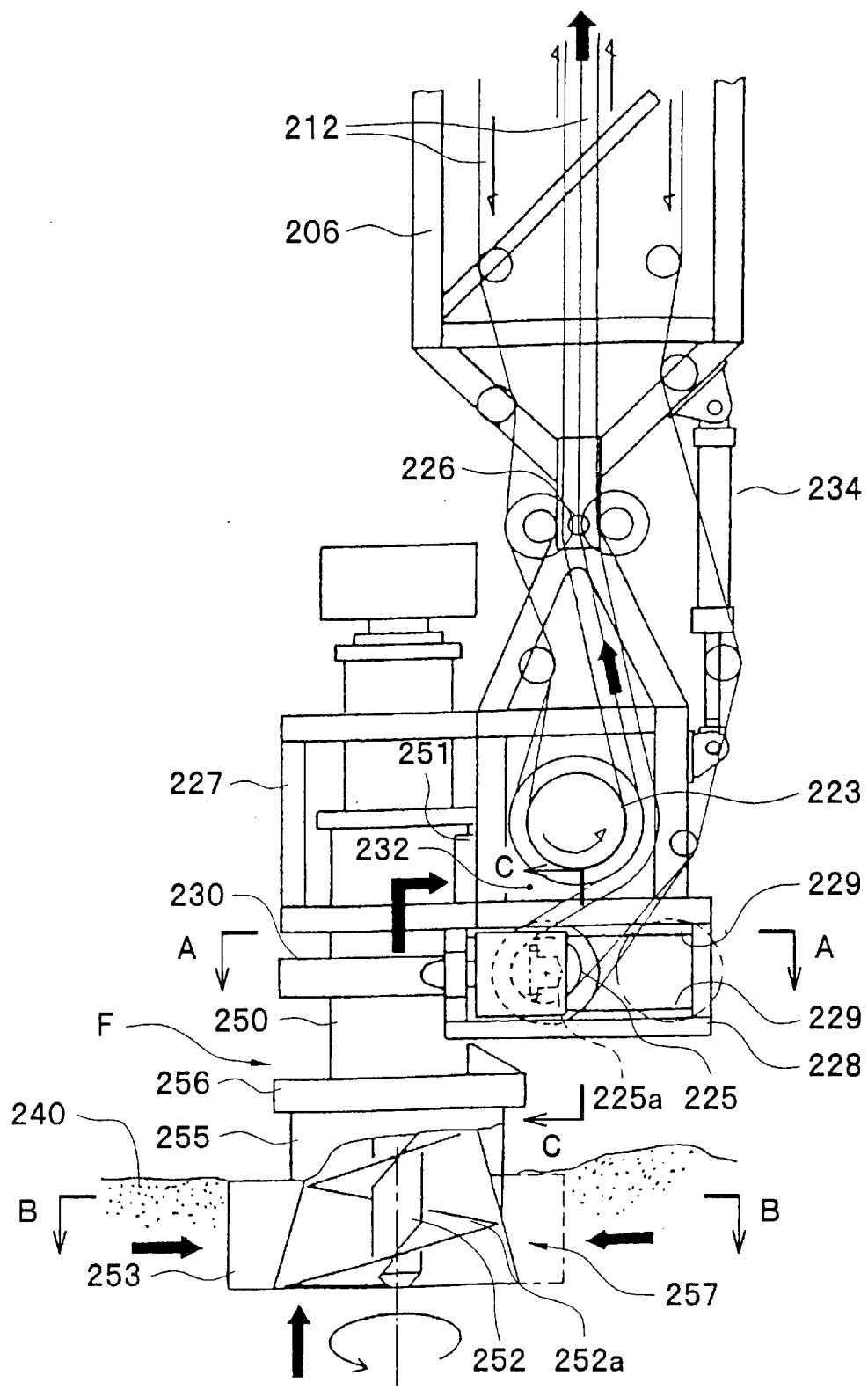
FIG. 16 is an enlarged side view of the end pulleys and the screw feeder unit at the bottom of the longitudinally conveying section of FIG. 15, the unloader unloading the bulk cargo from a ship's hold toward the land side.
Figure 17:
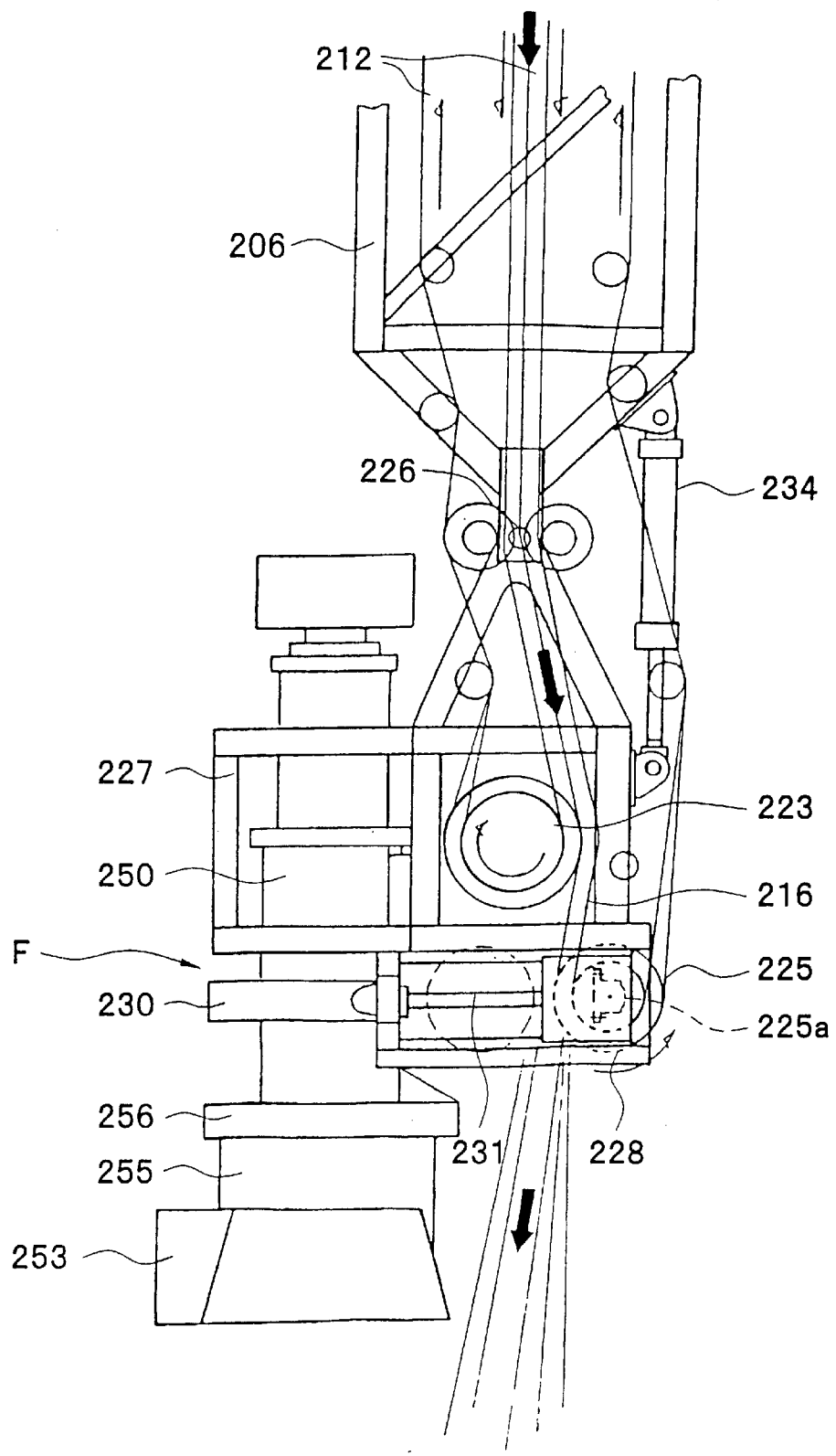
FIG. 17 is an enlarged side view of the same, the unloader loading bulk cargo from the land side into a ship's hold.

FIGS. 16 and 17 are enlarged side views of the end pulleys and the screw feeder unit F at the bottom of the longitudinally conveying section 211 of FIG. 15. In FIG. 16, bulk cargo is unloaded from a ship's hold toward the land side. In FIG. 17, bulk cargo is loaded into a ship's hold. As described earlier, the double-belt conveyor 212 on the lateral boom 205 is extended along the longitudinal boom 206, which is hanging down from the front end of the lateral boom 205, down to the bottom of the longitudinal boom 206 via pulleys with curved peripheries (not shown) disposed at the front end of the lateral boom 205. The numeral 223 indicates a stationary end pulley, and a straight-movable end pulley 225 is disposed under the stationary end pulley 223. Mounted pivotally by a pin 226 at the bottom of the longitudinal boom 206 is a supporting frame 227 to support the stationary end pulley 223. Fixed to the bottom of the supporting frame 227 is a supporting frame 228 to support the straight-movable end pulley 225.

Figure 18:
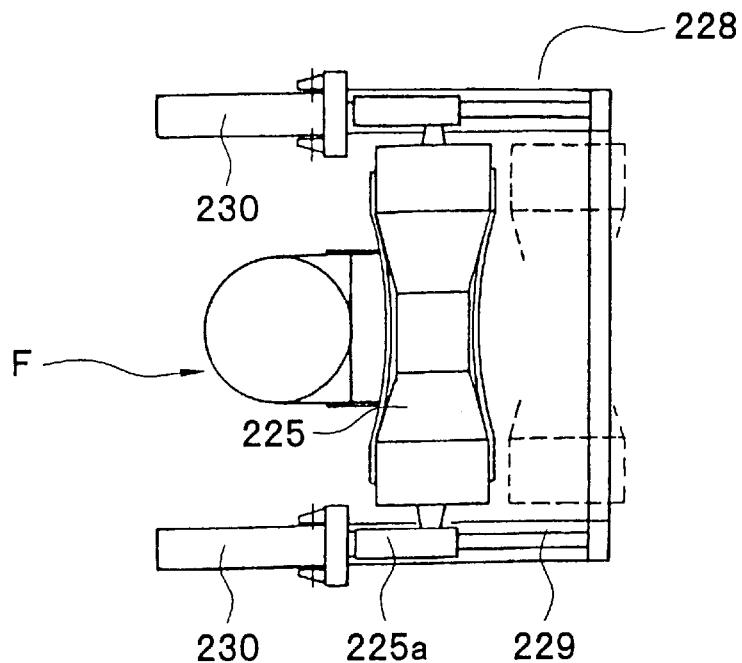
FIG. 18 is a sectional view taken along the arrowed line A—A of FIG. 16.
Figure 19:
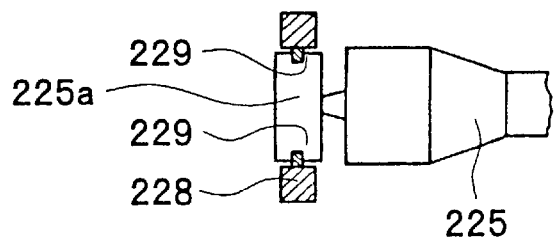
FIG. 19 is a partly sectional view taken along the arrowed line C—C of FIG. 16.

FIG. 18 is a sectional view taken along the allowed line A—A of FIG. 16. FIG. 19 is a partly sectional view taken along the arrowed line C—C of FIG. 16. As shown in FIGS. 16–19, on each side of the straight-movable end pulley 225, guide rails 229 are formed on the bottom surface of the upper member and on the top surface of the lower member of the straight-movable end pulley's supporting frame 228 so as to guide the bearing unit 225a of the straight-movable end pulley 225 for its lateral, straight movement. On each side of the straight-movable end pulley 225, an oil-hydraulic cylinder 230 is mounted on the front side of the straight-movable end pulley's supporting frame 228, and its piston rod 231 is connected to the bearing unit 225a of the straight-movable end pulley 225 so as to drive the straight-movable end pulley 225. The oil-hydraulic cylinders 230 on both sides of the straight-movable end pulley 225 move the straight-movable end pulley 225 laterally. When the piston rods 231 of the oil-hydraulic cylinders 230 are fully retracted, the straight-movable end pulley 225 takes a position almost directly under the stationary end pulley 223 to be ready for unloading. The stationary and straight-movable end pulleys 223 and 225 in such positions define a bulk-cargo receiving space 232 between and in front of them, as is shown in FIG. 16.

When the piston rods 231 of the oil-hydraulic cylinders 230 are fully protruded, the straight-movable end pulley 225 takes a rearward position relative to the stationary end pulley 223 so as to allow its belt 216 to take an almost upright posture in its vicinity, as is shown in FIG. 17. With the end pulleys 223 and 225 in such positions, the unloader is ready for loading. Needless to say, the running direction of the double-belt conveyor while loading is opposite to the running direction while unloading. In FIGS. 16, 17, and 20–22, thin arrows indicate the running directions of the belts; thick arrows, the direction of conveyance of bulk cargo.

Figure 20:
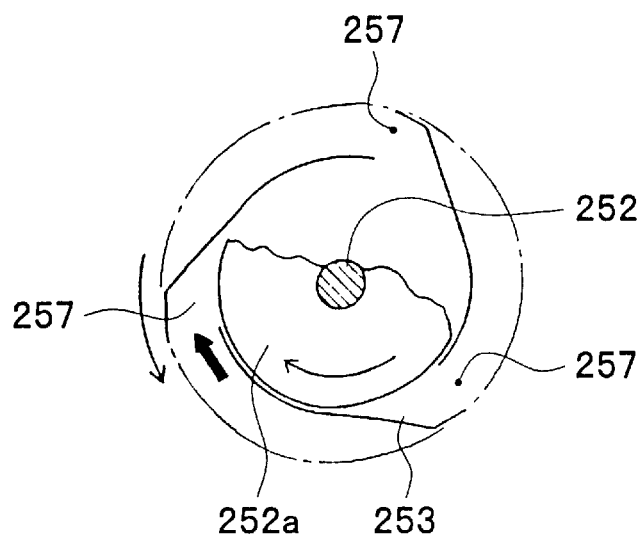
FIG. 20 is a sectional view taken along the arrowed line B—B of FIG. 16.

FIG. 20 is a sectional view taken along the arrowed line B—B of FIG. 16. As shown in FIGS. 16 and 20, the outer cylinder 250 of the screw feeder unit F is supported on a side of the stationary end pulley's supporting frame 227 and positioned close to the receiving space 232 between the stationary and straight-movable end pulleys 223 and 225. A discharge port 251 is provided on the outer cylinder 250, halfway in its height, in front of the receiving space 232. A screw shaft 252 with a screw blade 252a is set in the outer cylinder 250. The upper portion of the screw shaft 252 is journaled in bearings (not shown) held by the outer cylinder 250 and driven by an electric motor (not shown) mounted on the outside of the upper portion of the outer cylinder 250. An excavating shell 255 with excavating blades 253 is supported by a turn-table bearing 256 at the bottom of the outer cylinder 250. The excavating shell 255 is rotated, in the opposite direction to the screw shaft 252, by an oil hydraulic motor (not shown), which is supported by brackets (not shown) provided on the bottom portion of the outer cylinder 250. By rotating the excavating shell 255 in the opposite direction to the screw shaft 252, the bulk cargo 240 in the hold can be taken in through openings 257 toward the screw blade 252a.

A posture-retaining oil-hydraulic cylinder 234 is pivotally connected between a bottom side of the longitudinal boom 206 and a side of the stationary end pulley's supporting frame 227. The posture-retaining oil-hydraulic cylinder 234 causes the stationary end pulley's supporting frame 227 and, hence, the end pulleys 223 and 225 and the screw feeder unit F to turn, as one body, relative to the longitudinal boom 206, about the pin 226. Thus, when the angle of elevation of the lateral boom 205 is changed, the screw feeder unit F can be corrected into a vertical posture. In addition to the above screw feeder unit F, any devices which can take in deposited loose stuff and feed it to the bottom of the double-belt conveyor 212, for example a paddle-type feeder, can be adopted. As shown in FIG. 17, while bulk cargo is being loaded, the screw feeder unit F is at a stop and bulk cargo is discharged directly from the bottom end of the double-belt conveyor 212.

Figure 21:
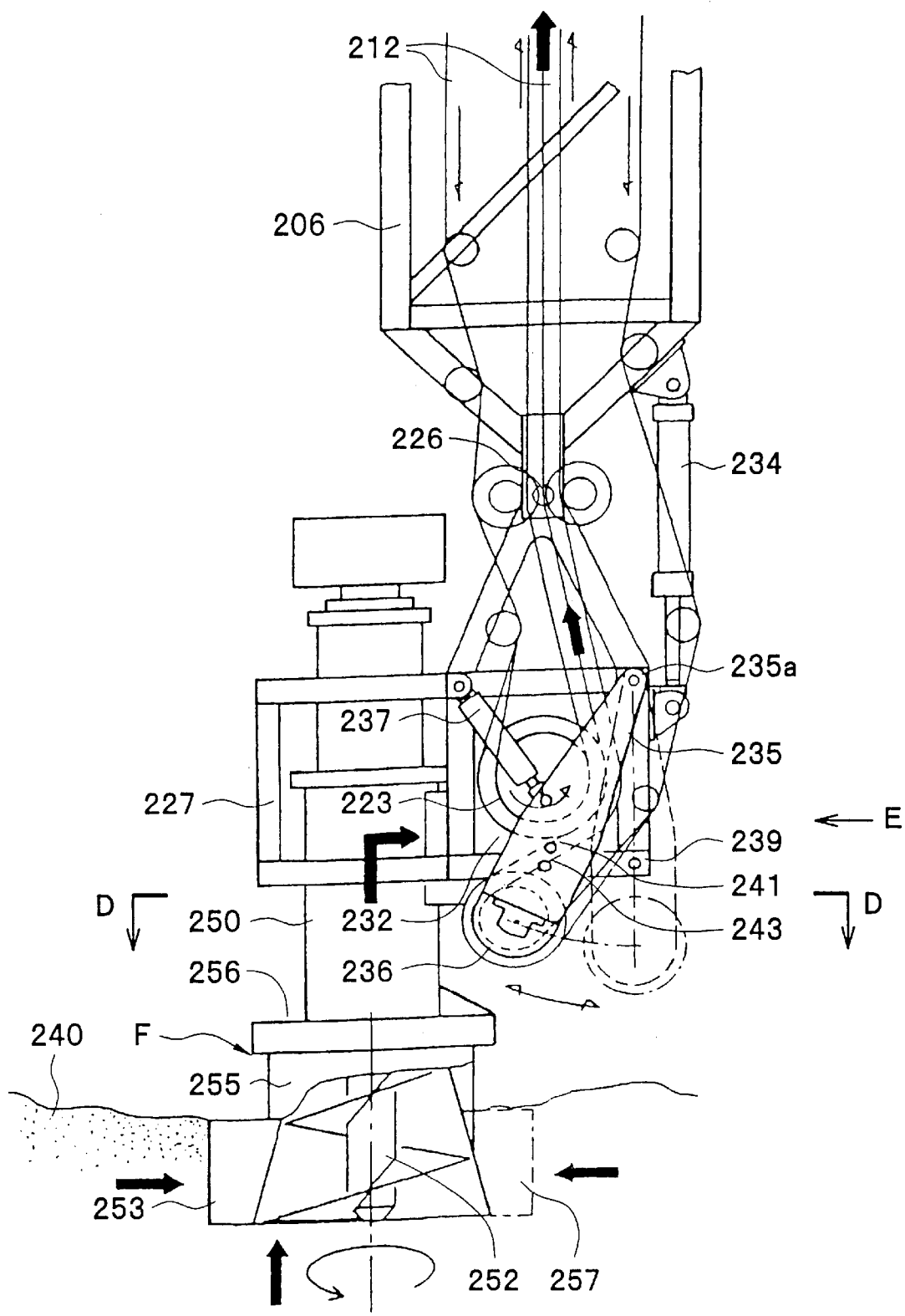
FIGS. 21 and 22 are enlarged side views of another embodiment of the bottom portion of the longitudinally conveying section of FIG. 16.
Figure 22:
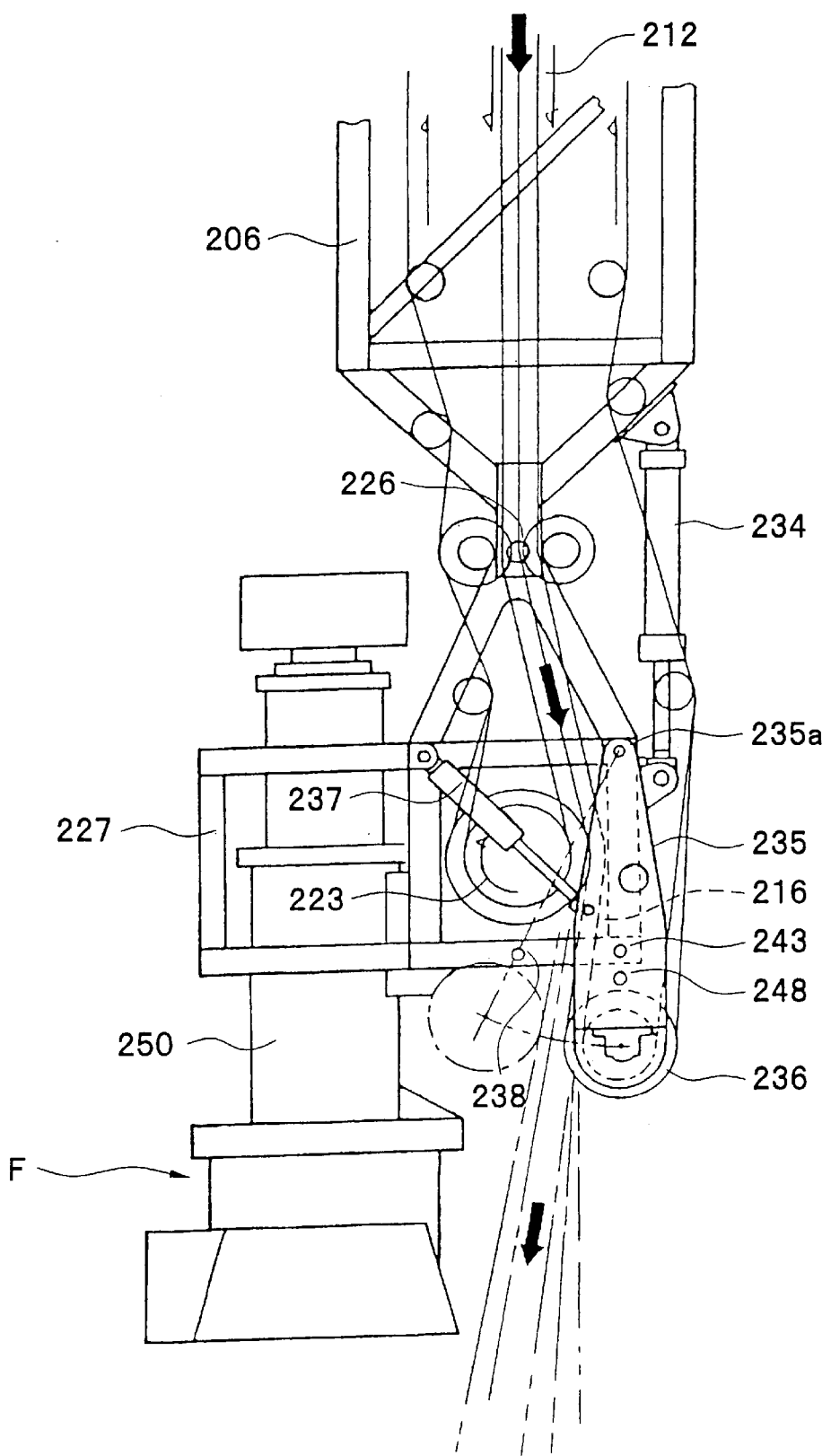
Figure 23:
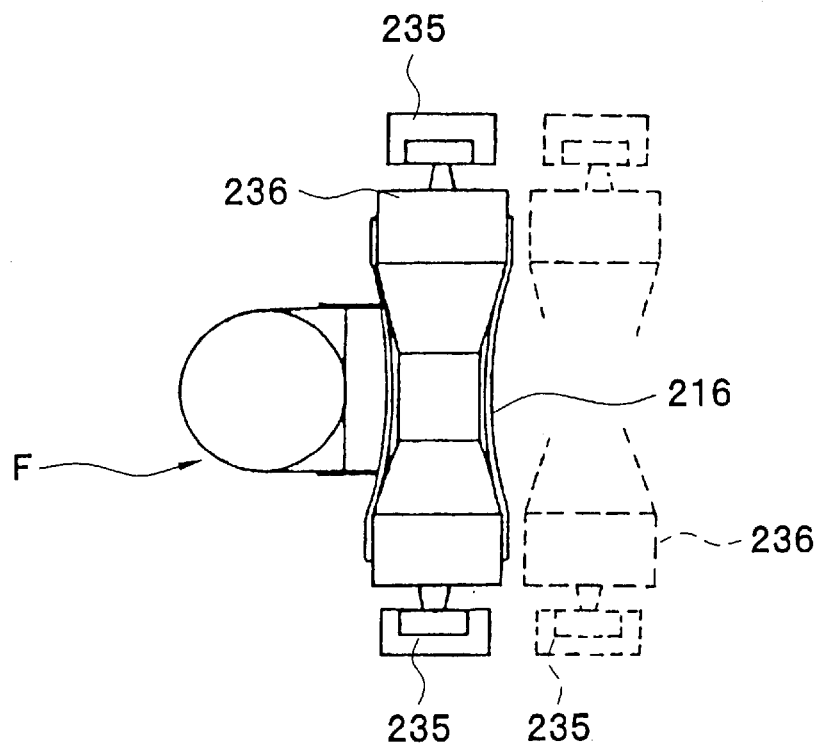
FIG. 23 is a sectional view taken along the arrowed line D—D of FIG. 21.
Figure 24:
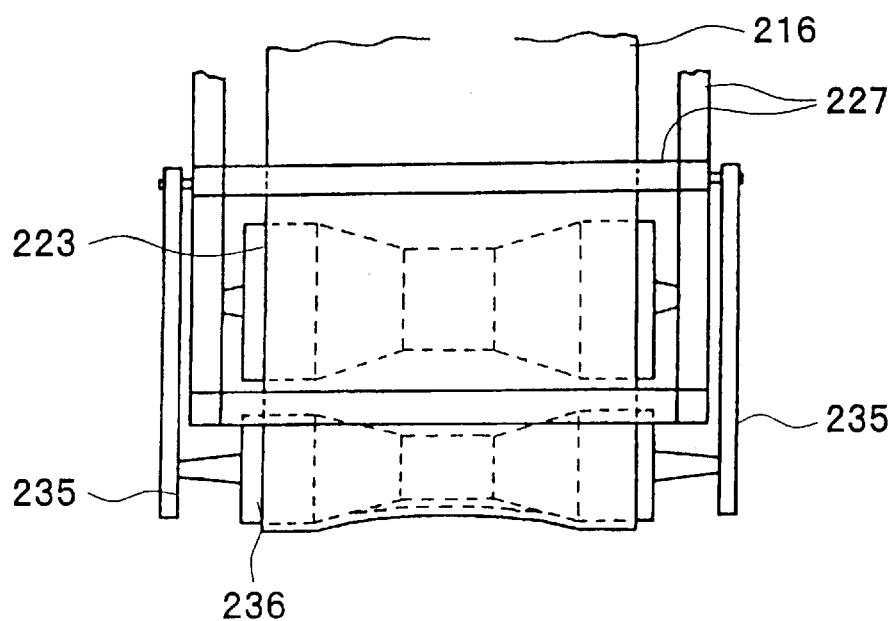
FIG. 24 is a partial side view as seen in the direction of arrow E of FIG. 21.

FIGS. 21 and 22 are enlarged side views of another embodiment of the bottom portion of the longitudinally conveying section 211 of FIG. 15. In FIG. 21, the bulk cargo 240 in a ship's hold is unloaded toward the land side. In FIG. 22, bulk cargo is loaded into a ship's hold. FIGS. 21 and 22 correspond to FIGS. 16 and 17, respectively. The common parts between the two embodiments are designated by the same numerals and letters, and the description of such common parts will be omitted as far as possible. Levers 235 are pivotally mounted on both the sides of the stationary end pulley's supporting frame 227 so as to support a swingable end pulley 236 at their bottoms, their pivots 235a on both the sides of the supporting frame 227 being positioned opposite to the screw feeder unit F over the stationary end pulley 223. Oil-hydraulic cylinders 237 are pivotally connected between the stationary end pulley's supporting frame 227 and the levers 235. The oil-hydraulic cylinders 237 swing the levers 235 and hence the swingable end pulley 236 about the pivots 235a so as to set the swingable end pulley 236 at a loading position and an unloading position selectively. The swingable end pulley 236 is situated below the stationary end pulley 223 and corresponds to the straight-movable end pulley 225 in FIGS. 16 and 17.

As shown in FIG. 21, to unload the bulk cargo in a ship's hold, the piston rods of the oil-hydraulic cylinders 237 are retracted to swing the levers 235 toward the stationary end pulley 223 and the swingable end pulley 236 to a position almost directly under the stationary end pulley 223, both pulleys 223 and 236 defining a receiving space 232 between and in front of them. Bulk cargo is taken in by the screw feeder unit F and fed through the receiving space 232 into between the belts of the double-belt conveyor 212.

As shown in FIG. 22, to load bulk cargo, namely to discharge bulk cargo carried forward by the double-belt conveyor 212 into a ship's hold, the piston rods of the oil-hydraulic cylinders 237 are protruded to swing the levers 235 away from the stationary end pulley 223 and the swingable end pulley 236 rearward relative to the stationary end pulley 223, the belt 216 of the swingable end pulley 236 taking an almost upright posture in the vicinity of the swingable end pulley 236. Bulk cargo carried forward by the double-belt conveyor 212 is discharged downward along the almost upright belt 216. As shown in FIG. 22, because the pivots 235a are positioned near the almost upright belt 216 of the swingable end pulley 236 and the swingable end pulley 236 supported by the levers 235 swings about the pivots 235a, the belt 216 does not become loose when the swingable end pulley 236 is swung to change over the loader's function between loading and unloading.

In the embodiment shown in FIGS. 21 and 22, on each side of the swingable end pulley 236, positioning holes 238 and 239 having a certain lateral spacing therebetween are made in the stationary end pulley's supporting frame 227, and pin holes 248 and 241 corresponding to the positioning holes 238 and 239 are made in the lever 235, the pin holes 248 and 241 having therebetween a certain spacing in the longitudinal direction of the lever 235. When the swingable end pulley 236 takes the position for unloading, the lower pin hole 248 of the lever 235 and a positioning hole 238 of the stationary end pulley's supporting frame 227 overlap each other on each side of the swingable end pulley 236, and a pin 243 is inserted in the overlapping holes to fix the swingable end pulley 236 at the unloading position (FIG. 21). On the other hand, when the swingable end pulley 236 takes the position for loading, the upper pin hole 241 of the lever 235 and a positioning hole 239 of the stationary end pulley's supporting frame 227 overlap each other on each side of the swingable end pulley 236, and a pin 243 is inserted in the overlapping holes to fix the swingable end pulley 236 at the loading position (FIG. 22).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What I claim is:

1. An unloader wherein a screw feeder is so mounted on a vertically conveying section that the former can, relative to the latter, ascend and descend freely from and to its mounted position and bulk cargo is fed into a receiving space of the vertically conveying section through a discharge port made in the screw casing of the screw feeder, characterized by:

the discharge port which is positioned by discharge blades of the screw feeder and extended downward by the length of ascending/descending stroke of the screw feeder; and a blocking casing which is mounted on the vertically conveying section so that the outer surface of the screw casing comes in sliding contact with the blocking casing and the blocking casing closes generally the lower half of the discharge port while the screw feeder is in its mounted position.

2. An unloader as claimed in claim 1 characterized by:

a top rubber cover, a bottom rubber cover, and a pair of side rubber covers which are mounted on a frame of the vertically conveying section so as to border the receiving space on the top, bottom, and both sides;

a discharge-port guide plate which is mounted above the discharge port on the screw casing so as to be in sliding contact with the edge, on the screw casing's side, of the top rubber cover;

a pair of discharge-port side plates which are mounted on both sides of the discharge port on the screw casing so as to be in sliding contact with the edges, on the screw casing's side, of the side rubber covers; and the discharge-port guide plate of which the longitudinal length is generally the same as the length of the ascending/descending stroke of the screw feeder.

3. An unloader including (i) an upward-conveying section which is pivoted at its top and of which the bottom is inserted in bulk cargo, (ii) a downward-conveying section which is positioned above the bulk-cargo receiving portion of a discharge conveyor and turnable about its vertical axis, and (iii) a laterally conveying section comprising a boom which is pivotally mounted on the top of the downward-conveying section so as to be swingable up and down and which connects between the upward-conveying section and the downward-conveying section, the upward-, laterally-, and downward-conveying sections constituting a conveying path of the shape of an upside-down U, wherein:

two endless belts are installed through the upward-, laterally, and downward-conveying sections, their carrying surfaces facing and overlapping each other, the two endless belt constituting a double-belt conveyor;

the discharging end of the double-belt conveyor is positioned close to the bulk-cargo receiving portion of the discharge conveyor; and two end pulleys of the discharging end of the double-belt conveyor are differentiated from each other in height and drive the two endless belts.

4. An unloader as claimed in claim 3, wherein:

the downward-conveying section comprises a fixed cylindrical casing positioned close to the discharge conveyor, a slewing cylindrical casing supported freely turnably on the fixed cylindrical casing, and an end-pulley driving device mounted on a supporting frame in the slewing cylindrical casing;

the discharging end of the double-belt conveyor is inserted in the slewing cylindrical casing and positioned close to the discharge conveyor; and the boom of the laterally conveying section is jointed to the top of the slewing cylindrical casing so as to be swingable up and down.

5. An unloader comprising:

a laterally conveying section supported on a slewing frame so as to be turnable and swingable up and down;

a longitudinally conveying section pivotally mounted on the front end of the laterally conveying section so as to be swingable;

a double-belt conveyor installed from the base, supported on the slewing frame, of the laterally conveying section to the bottom of the longitudinally conveying section;

a bulk-cargo supplying unit disposed above the portion of the double-belt conveyor near the base of the laterally conveying section; and a downward-conveying section disposed under the base of the laterally conveying section, two end pulleys of the double-belt conveyor at the bottom of the longitudinally conveying section being differentiated from each other in height, the lower end pulley being supported in the longitudinally conveying section so as to allow the lower end pulley to move laterally as a whole, a drive unit to drive the lower end pulley laterally being provided at the bottom of the longitudinally conveying section.

6. An unloader as claimed in claim 5 wherein the lower end pulley at the bottom of the longitudinally conveying section moves between a loading position almost directly under the upper end pulley and an unloading position where the belt of the lower end pulley takes an almost upright posture in the vicinity of the lower end pulley.

7. An unloader as claimed in claim 5 or 6 wherein the drive unit for driving the lower end pulley laterally has (i) guide rails for supporting and guiding the bearing units of the lower end pulley and (ii) oil-hydraulic cylinders connected to the bearing units.

8. An unloader as claimed in claim 5 or 6 wherein the drive unit for driving the lower end pulley laterally has (i) levers which support the bearing units of the lower end pulley and of which the tops are pivotally supported on a frame of the longitudinally conveying section, (ii) oil-hydraulic cylinders to swing the levers, and (iii) means for positioning and fixing the levers at a position for loading and a position for unloading.

* * * * *